US009930041B2

(12) United States Patent
Warren

(10) Patent No.: US 9,930,041 B2
(45) Date of Patent: Mar. 27, 2018

(54) ANTI-TAKEOVER SYSTEMS AND METHODS FOR NETWORK ATTACHED PERIPHERALS

(71) Applicant: Vivint, Inc., Provo, UT (US)

(72) Inventor: Jeremy B. Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/355,052

(22) Filed: Nov. 18, 2016

(65) Prior Publication Data
US 2017/0142114 A1 May 18, 2017

Related U.S. Application Data

(63) Continuation of application No. 14/166,561, filed on Jan. 28, 2014, now Pat. No. 9,503,476.

(51) Int. Cl.
*H04L 29/06* (2006.01)
*H04L 9/06* (2006.01)
*H04L 9/08* (2006.01)

(52) U.S. Cl.
CPC .......... *H04L 63/10* (2013.01); *H04L 9/0643* (2013.01); *H04L 9/0869* (2013.01); *H04L 63/08* (2013.01)

(58) Field of Classification Search
CPC ....... H04L 63/10; H04L 63/08; H04L 9/0643; H04L 9/0869
See application file for complete search history.

(56) References Cited

U.S. PATENT DOCUMENTS

| 6,212,635 B1 * | 4/2001 | Reardon | ................. G06F 21/34 380/30 |
| 6,463,537 B1 * | 10/2002 | Tello | ...................... G06F 21/34 380/277 |

(Continued)

FOREIGN PATENT DOCUMENTS

| EP | 2026529 A1 | 2/2009 |
| WO | 2010023506 A1 | 3/2010 |
| WO | 2013135898 A1 | 9/2013 |

OTHER PUBLICATIONS

Verma et al., Data theft prevention & endpoint protection from Unauthorized USB devices, Dec. 2012, Fourth International Conference on Advanced Computing, pp. 1-4.*

(Continued)

*Primary Examiner* — Kenneth Chang
(74) *Attorney, Agent, or Firm* — Holland & Hart LLP

(57) ABSTRACT

Methods, systems, and devices are described for the prevention of network peripheral takeover activity. Peripheral devices may implement an anti-takeover mechanism limiting the number of available device command classes when certain handshake and verification requirements are not met. Anti-takeover peripheral devices with protection enabled may be relocated within a controller network, or in certain cases, from one controller network to another controller network when certain conditions are met. That same device may be hobbled when removed from a controller network and may remain hobbled when connected to another network that fails to meet certain conditions. Unprotection and unhobbling of a device may occur through an algorithmic mechanism using values stored on the peripheral device and the controller device for one or more of anti-takeover code generation, anti-takeover code comparison, network identification value comparison, and manufacturer identification value comparison.

18 Claims, 19 Drawing Sheets

(56) References Cited

U.S. PATENT DOCUMENTS

| | | |
|---|---|---|
| 7,752,444 B2 | 7/2010 | Leech |
| 2002/0081993 A1 | 6/2002 | Toyoshima |
| 2007/0242729 A1 | 10/2007 | Quinn et al. |
| 2008/0294922 A1 | 11/2008 | Hsieh |
| 2009/0138623 A1 | 5/2009 | Bosch et al. |
| 2010/0180130 A1 | 7/2010 | Stahl et al. |
| 2010/0192123 A1 | 7/2010 | Carey et al. |
| 2011/0035585 A1 | 2/2011 | Haddad |
| 2011/0179277 A1 | 7/2011 | Haddad et al. |
| 2011/0208963 A1* | 8/2011 | Soffer .................... G06F 3/023 713/168 |
| 2013/0046867 A1 | 2/2013 | Seelman et al. |
| 2013/0212669 A1 | 8/2013 | Wilson |
| 2013/0223278 A1 | 8/2013 | Inada |
| 2013/0340069 A1 | 12/2013 | Yoffe et al. |
| 2013/0340088 A1 | 12/2013 | Thadikaran et al. |
| 2015/0052616 A1 | 2/2015 | Hutchison et al. |

OTHER PUBLICATIONS

Supplementary European Search Report for EP Application No. 15742794, dated Jun. 1, 2017 (7 pages).

Menezes, A. J. et al., "Hash Functions and Data Integrity", Handbook of Applied Cryptography, CRC Press Series on Discrete Mathematics and its Applications, CRC Press, Boca Raton, FL, XP002275660, ISBN: 978-0-8493-8523-0, Jan. 1, 1997, pp. 321-383.

International Search Report and Written Opinion of the International Searching Authority for PCT/US2015/013338, dated Apr. 30, 2015.

Shebaro, "Context-Based Access Control Systems for Mobile Devices," Mar. 2015, IEEE, p. 150-163.

* cited by examiner

ANTI-TAKEOVER SYSTEMS AND METHODS FOR NETWORK ATTACHED PERIPHERALS

CROSS-REFERENCE TO RELATED APPLICATIONS

The present application is a continuation of U.S. patent application Ser. No. 14/166,561, titled: "Anti-Takeover Systems and Methods for Network Attached Peripherals", filed on Jan. 28, 2014. The disclosure of which is incorporated by reference herein in its entirety.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor an aspect of a home or business. Protection mechanisms preventing competitors from taking over and utilizing automation and security system peripheral devices while simultaneously allowing such devices to be transferred between a dealer's own networks may not be available.

SUMMARY

The systems and methods described herein relate to home automation and home security. More specifically, the systems and methods described herein relate to the prevention of network peripheral takeover activity. Peripheral devices may include anti-takeover devices and unprotected devices without anti-takeover mechanisms. Anti-takeover devices may implement an anti-takeover mechanism limiting the number of available device command classes when certain handshake and verification requirements are not met. This mechanism may operate in the case of an anti-takeover device participating as a node in a network while in protected mode, or where the anti-takeover device is removed from a network while the device is in a protected mode. Unprotected devices may include peripheral devices that do not include an anti-takeover mechanism, and therefore provide unrestricted access to the command classes associated with the peripheral device.

Anti-takeover peripheral devices with protection enabled may be relocated within a controller network, or in certain cases, from one controller network to another controller network when certain conditions are met. That same device may be hobbled when removed from a controller network and may remain hobbled when connected to another network that fails to meet certain conditions. The transition of a peripheral device from a protected/hobbled state to a protected/unhobbled state or to an unprotected state may occur based, at least in part, on handshake and verification activities between the protected peripheral device and the controller device without the use of authentication schemes relying on remotely stored authentication information. Unprotection of a device may occur through an algorithmic mechanism using values stored on the peripheral device and the controller device for anti-takeover code generation, anti-takeover code comparison, network identification value comparison, and manufacturer identification value comparison. Introduction of a new controller device to an existing controller network may involve related handshake and verification methods between the new controller and the networked peripheral devices such that the networked peripheral devices will provide command class information to the new controller node.

In one embodiment, an automated anti-takeover method includes storing a first shared secret value at a controller, establishing a data session between the controller and a network, and generating an anti-takeover code, the anti-takeover code derived, at least in part, from a calculation seeded with the shared secret value.

In one example, the method further may include generating a first hint package at the controller, and transmitting the anti-takeover code and the first hint package. The method may further include generating a random number wherein the calculation is seeded with the random number. The method may further include receiving at the controller a node information message, the node information message comprising a second hint package. The second hint package may further include at least one from the group of a randomly generated value, a shared secret version value, and a network identification value. Generating the anti-takeover code may include performing a one-way function calculation. Performing the one-way function calculation may include seeding a hash function with one or more hint package values and the first shared secret value. The first shared secret value may be associated with at least one from the group of a manufacturer identification value and the network identification value. The method may further include storing a second shared secret value.

Another embodiment is directed to an automated peripheral anti-takeover method. The method includes establishing a data session between the peripheral device and a first network, and receiving a hint package and a first anti-takeover code at the peripheral device. The first anti-takeover code is derived, at least in part, from a first calculation seeded with a first shared secret value.

In one example, the method may further include storing the hint package and the first anti-takeover code at the peripheral device, detecting a network exclusion event at the peripheral device, hobbling the peripheral device in response to detecting the network exclusion event, establishing a data session between the peripheral device and a second network, transmitting at the peripheral device the hint package, and receiving a second anti-takeover code at the peripheral device. The second anti-takeover code may be derived, at least in part, from a second calculation seeded with a second shared secret value. The hint package may further include at least one from the group of a randomly generated value, a shared secret version value, and a network identification value. The method may further include determining at the peripheral device if the second received anti-takeover code matches the stored anti-takeover code, and unhobbling the peripheral device based, at least in part, on determining at the peripheral device that the second received anti-takeover code matches the stored anti-takeover code. Establishing a data session may include a wireless network connection.

A further embodiment is directed to a controller device that includes at least one processor configured to store a first shared secret value at a controller, establish a data session between the controller and a network, and generate an anti-takeover code, the anti-takeover code derived, at least in part, from a calculation seeded with the shared secret value.

In one example, the at least one processor may be configured to generate a first hint package at the controller, and transmit the anti-takeover code and the first hint package. The at least one processor may be configured to generate a random number, wherein the calculation is seeded with the random number. The least one processor may be configured to receive a node information message, wherein the node information message includes a second hint package. The second hint package may further include at least one from the group of a randomly generated value, a shared secret version value, and a network identification value. The at least one processor may be configured to generate the anti-takeover code comprises a one-way function calculation.

Another embodiment relates to a peripheral device that includes at least one processor configured to establish a data session between the peripheral device and a first network, and receive a hint package and a first anti-takeover code at the peripheral device. The first anti-takeover code is derived, at least in part, from a first calculation seeded with a first shared secret value.

In one example, the at least one processor may be configured to store the hint package and the first anti-takeover code at the peripheral device, detect a network exclusion event at the peripheral device, hobble the peripheral device, establish a data session between the peripheral device and a second network, transmit the hint package, and receive a second anti-takeover code at the peripheral device. The second anti-takeover code may be derived, at least in part, from a second calculation seeded with a second shared secret value. The hint package may further include at least one from the group of a randomly generated value, a shared secret version value, and a network identification value. The at least one processor may be configured to determine at the peripheral device if the second received anti-takeover code matches the stored anti-takeover code, and unhobble the peripheral device based, at least in part, on the second received anti-takeover code matching the stored anti-takeover code.

A further embodiment relates to a controller anti-takeover computer program product that includes a non-transitory computer-readable medium comprising code for storing a first shared secret value at a controller, code for establishing a data session between the controller and a network, and code for generating an anti-takeover code. The anti-takeover code is derived, at least in part, from a calculation seeded with the shared secret value.

In one example, the controller anti-takeover computer program product further includes a non-transitory computer-readable medium comprising code for generating a first hint package at the controller, and code for transmitting the anti-takeover code and the first hint package.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
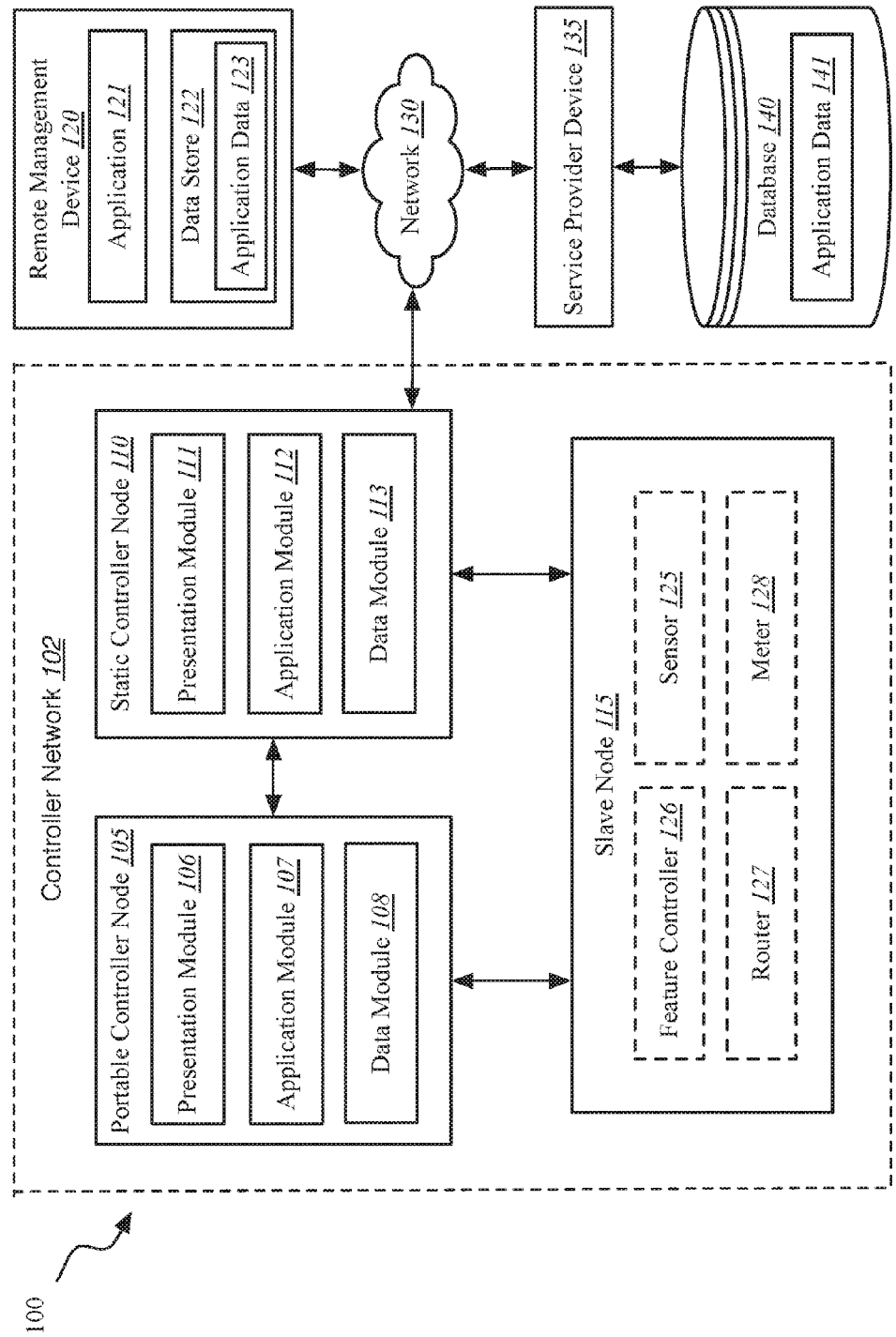
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security. More specifically, the systems and methods described herein relate to the prevention of network peripheral takeover activity.

FIG. 1 is a block diagram illustrating one embodiment of an environment 100 in which the present systems and methods may be implemented. In some embodiments, the systems and methods described herein may be performed on a device (e.g., portable controller node 105, static controller node 110, slave controller node 115) related to one or more controller networks 102. A controller network 102 may include one or more controller nodes 105, 110 and one or more slave nodes 115. Slave nodes 115 may include peripheral devices such as, for example, feature controllers 126, sensors 125, routers 127, and meters 128. Peripheral devices may include anti-takeover devices and unprotected devices without anti-takeover mechanisms. Anti-takeover devices may implement an anti-takeover mechanism limiting the number of available device command classes when certain handshake and verification requirements are not met. This mechanism may operate in the case of an anti-takeover device participating as a node in a network while in protected mode, or where the anti-takeover device is removed from a network while the device is in a protected mode. Unprotected devices may include peripheral devices that do not include an anti-takeover mechanism, and therefore provide unrestricted access to the command classes associated with the peripheral device.

Anti-takeover peripheral devices with protection enabled may be relocated within a controller network, or in certain cases, from one controller network to another controller network when certain conditions are met. That same device may be hobbled when removed from a controller network and may remain hobbled when connected to another network that fails to meet certain conditions. The transition of a peripheral device from a protected/hobbled state to a protected/unhobbled state or to an unprotected state may occur based, at least in part, on handshake and verification activities between the protected peripheral device and the controller device without the use of authentication schemes relying on remotely stored authentication information. Unprotection of a device may occur through an algorithmic mechanism using values stored on the peripheral device and the controller device for anti-takeover code generation, anti-takeover code comparison, network identification value comparison, and manufacturer identification value comparison. Introduction of a new controller device to an existing controller network may involve related handshake and verification methods between the new controller and the networked peripheral devices such that the networked peripheral devices will provide command class information to the new controller node.

Still referring to FIG. 1, the environment 100 may include a remote management device 120, a service provider device 135, a sensor 125, a feature controller 126, a router 127, a meter 128, and/or a network 130 that allows the remote management device 120, service provider device 135, controller network nodes 105, 110, 115, to communicate with one another. Examples of remote management device 120 include multi-site dashboards, mobile devices, smart phones, personal computing devices, computers, servers, etc. Examples of controller nodes 105, 110 include a dedicated home automation computing device (e.g., wall-mounted controller), a personal computing device (e.g., laptop, desktop, etc.), a mobile computing device (e.g., tablet computing device, smartphone, mobile remote device, etc.), and the like.

In some embodiments, remote management device 120 may be integrated with controller network 102 in the form of one or more personal computing devices (e.g. mobile devices, smart phones, and/or personal computing devices) to both control aspects of a property as well as to receive and display notifications regarding monitored activity of a property. Examples of sensor 125 include a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, and the like.

Sensor 125 may represent one or more separate sensors or a combination of two or more sensors in a single sensor device. For example, sensor 125 may represent one or more camera sensors and one or more motion sensors connected to environment 100. Additionally, or alternatively, sensor 125 may represent a combination sensor such as both a camera sensor and a motion sensor integrated in the same sensor device. Although sensor 125 is depicted as connecting to controller node 110 over network 130, in some embodiments, sensor 125 may connect directly to remote management device 120. Additionally, or alternatively, sensor 125 may be integrated with a home appliance or fixture such as a light bulb fixture. Sensor 125 may include an accelerometer to enable sensor 125 to detect a movement. Sensor 125 may include a wireless communication device enabling sensor 125 to send and receive data and/or information to and from one or more devices in environment 100. Additionally, or alternatively, sensor 125 may include a GPS sensor to enable sensor 125 to track a location of sensor 125. Sensor 125 may include a proximity sensor to enable sensor to detect proximity of a person relative to a predetermined distance from a dwelling (e.g., geo-fencing). Sensor 125 may include one or more security detection sensors such as, for example, a glass break sensor, a motion detection sensor, or both. Additionally, or alternatively, sensor 125 may include a smoke detection sensor, a carbon monoxide sensor, or both.

Feature controller 126 may represent one or more separate feature controls or a combination of two or more feature controls in a single feature controller device. For example, feature controller 126 may represent one or more camera controls and one or more door lock controls connected to environment 100. Additionally, or alternatively, feature controller 126 may represent a combination feature controller such as both a camera control and a door lock control integrated in the same feature controller device. Although feature controller 126 is depicted as connecting to remote management device 120 over network 130, in some embodiments, feature controller 126 may connect directly to remote management device 120. Additionally, or alternatively, feature controller 126 may be integrated with a home appliance or fixture such as a light bulb fixture. Feature controller 126 may include a lighting control mechanism configured to control a lighting fixture. Feature controller 126 may include a wireless communication device enabling feature controller 126 to send and receive data and/or information to and from one or more devices in environment 100. Additionally, or alternatively, feature controller 126 may include an appliance control interface enabling feature controller 126 to send commands to an integrated appliance interface. Feature controller 126 may include an interface to a security system to monitor, activate, modify and/or arm one or more security features.

Router 127 may represent one or more slave nodes functioning as a router when a source node (e.g. a controller node 105, 110) attempts to reach a destination node (e.g. another slave node 115) where the source node is out of direct range of the destination node. The routing slave node 127 may have the same functionality as a non-routing slave node 125, 126, 128, but in addition the routing node 127 may initiate transmission of data to one or more other nodes in the controller network 102. In some instances, the routing slave may be mains powered, battery powered, or both. Routing slave nodes 127 may include, for example, a movement detector. In some cases, the routing slave may be include an external EEPROM for storing application data.

Meter 128 may represent a slave node configured to realize various types of meters, such as gas, water and electricity meters. In some instances, a meter 128 is a pulse meter reporting pulses having a specific meaning for a specific meter type.

In some configurations, remote management device 120 may include components such as application 121 and data store 122. Although the components of remote management device 120 are depicted as being internal to remote management device 120, it is understood that one or more of the components may be external to the remote management device 120 and connect to remote management device 120 through wired and/or wireless connections. For example, one or more components (e.g., software, firmware, and/or hardware) of application 121 may be located, installed, and/or part of a controller node 105, 110, service provider device 135, slave node 115, and/or database 140.

In some embodiments, remote management device 120 may include a television set. Additionally, or alternatively, management device 120 may include one or more processors, one or more memory devices, and/or a storage device. Examples of management device 120 may include a viewing device associated with a media content set top box, satellite set top box, cable set top box, DVRs, personal video recorders (PVRs), and/or mobile computing devices, smart phones, personal computing devices, computers, servers, etc. Thus, application 121 may be installed on management device 120 in order to allow a user to interface with a function of controller node 110 and/or service provider device 135.

In some embodiments, remote management device 120 may communicate with service provider device 135 via network 130. Examples of networks 130 include cloud networks, local area networks (LAN), wide area networks (WAN), virtual private networks (VPN), wireless networks (using 802.11, for example), and/or cellular networks (using 3G and/or LTE, for example), etc. In some configurations, the network 135 may include the Internet. In some embodiments, a user may access the functions of controller node 110 from management device 120. For example, in some embodiments, management device 120 includes a mobile application that interfaces with one or more functions of controller node 110 and/or service provider device 135.

In certain implementations, controller node 105, 110 includes components such as presentation module 106, 111 application module 107, 112 and data module 108, 113 Although the components of controller node 105, 110 are depicted as being internal to controller node 105, 110, it is understood that one or more of the components may be external to the controller node 105, 110 and connect to remote management device 120 through wired and/or wireless connections. For example, one or more components (e.g., software, firmware, and/or hardware) of application module 107, 112 may be located in, installed at, and/or part of remote management device 120, web service application module (not shown), service provider device 135, and/or database 140. Data content and data management functions of data module 108, 113 may be located, replicated, or both in one or more of database 140, and remote management device data store 122.

In some instances, the controller network 102 will include one or more static controllers 110 residing in a fixed locations within the controller network 102. The static controller 110 may serve as a receiver for sensors and battery-operated devices that need to send unsolicited reports to a controller, and may also act as an internet gateway, which can be accessed remotely. The static controller 110 may also provide routing support between nodes in the controller network 102. This may include collecting node Information, maintaining a routing table, creating routing lists and using routing lists for data transmissions. The controller network may also include one or more portable controllers 105 that do not maintain fixed locations in the controller network 102.

In some embodiments, service provider device 135 may be coupled to database 140. Database 140 may include application data 141 associated with the monitored activities of a property. For example, remote management device 120 may access application data 141 in database 140 over network 130 via service provider device 135. Database 140 may be internal or external to the service provider device 135. In one example, remote management device 120 may include an integrated data store 122, being internal or external to device 120. Data store 122 may include application data 123 associated with the monitoring activities of a property. In some embodiments, application data 123 includes one or more replicated application data 141 items. In certain instances, one or more application data 141 items are synchronized with one or more application data 123 items.

Application 121 may allow a user to control (either directly or via controller node 110) an aspect of the monitored property, including security, energy management, locking or unlocking a door, checking the status of a door, locating a person or item, controlling lighting, thermostat, cameras, receiving notification regarding a current status or anomaly associated with a home, office, place of business, and the like. In some configurations, application 121 may enable device 120 to interface with controller node 110 and provide a graphical user interface to display home automation content on remote management device 120. Thus, application 121, via the graphical user interface, may allow users to control aspects of their home and/or office.

Figure 2:
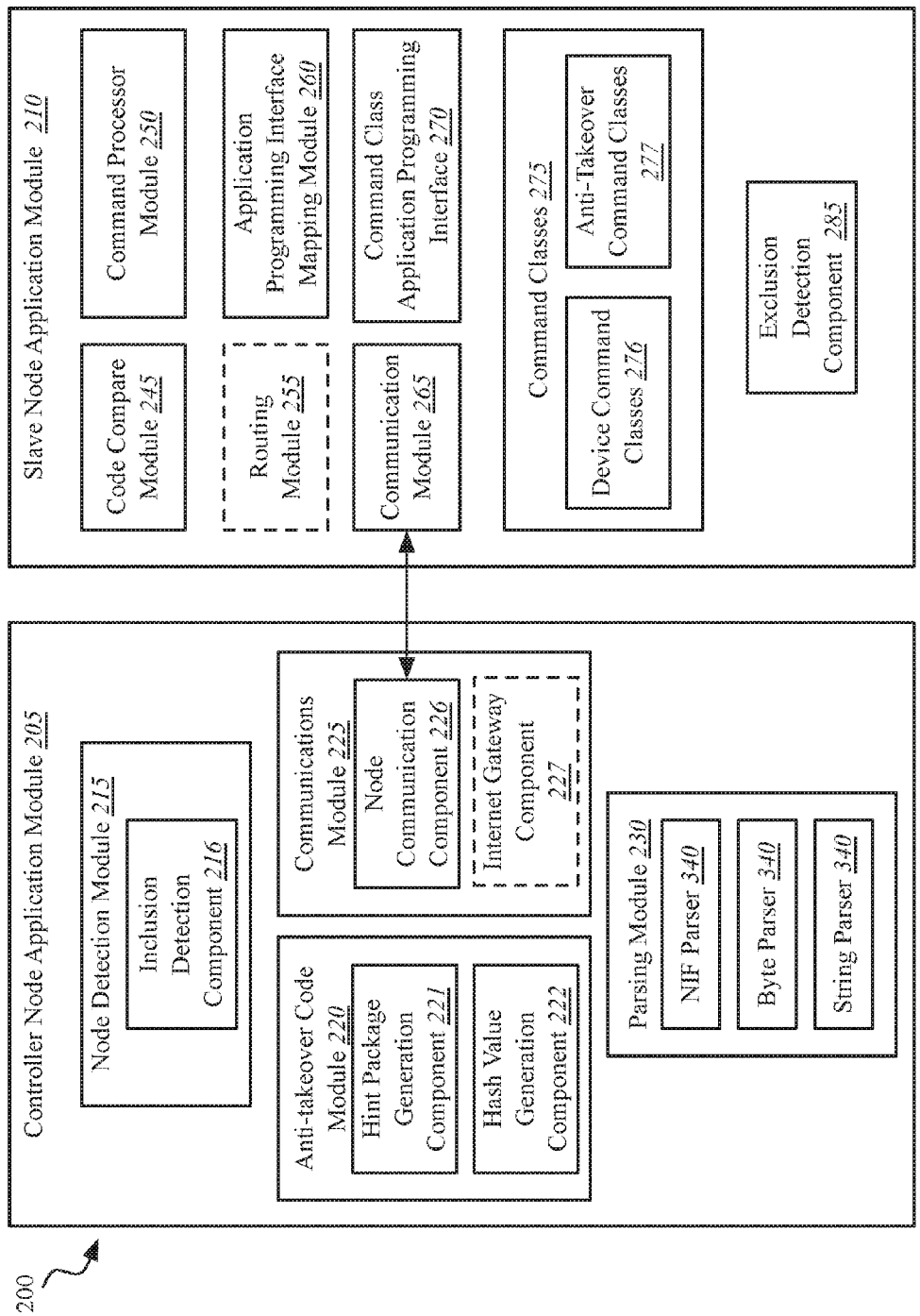
FIG. 2 is a block diagram of one example of component architecture for a controller node and slave node in the controller network of FIG. 1.

Referring now to FIG. 2, in some embodiments, an example controller node application module 205 of the application modules 107, 112 includes a node detection module 215, an anti-takeover code module 220, a communications module 225, and a parsing module 230. The node detection module 215 may detect inclusion and exclusion events related to connection activity, node connection request activity, or both. In certain instances, an inclusion detection component 216 detects a message received as a result of an attempted network connection by a peripheral device. This message may be generated by the peripheral device as a result of the peripheral device detecting the presence and availability of a the network, by another network-connected device as a result of detecting the presence of the peripheral device or acting in a routing capacity, or in response to a command from a controller node 105, 110 (e.g., see FIG. 1).

In some implementations, a communications module 225 includes a node communication component 226 and an optional Internet gateway component 227. The node communication component 226 may provide support for transmitting and receiving messages to and from slave nodes 115 (e.g., see FIG. 1), controller nodes 105, 110, or both. The communication module may access and use routing tables and routing lists stored in data module 108, 113 for controller network data transmissions. An optional Internet gateway component 227 may provide communication support for communicating with remote management devices 120, service provider devices 135, web services (not shown), and the like.

In certain instances, an anti-takeover code module 220 generates a code for use in preventing peripheral device take-over activities. For example, in some embodiments, the anti-takeover code module includes a hint package generation component 221 and a hash value generation component 222. The hint package generated by the hint package generation component 221 may be used as an identifier or key value for retrieving or generating an anti-takeover code. The exact format and meaning of the sub-codes within the hint package may be specific to the product or service enabling anti-takeover protection on the peripheral device, and may be associated with a manufacturer identification value. The hint package generation component 221 may, for example, generate a set of hint bytes representative of a combination of a dealer identification value, a shared secret version value, and a set of random bytes. The dealer identification value and shared secret version value may reside in a persistent data store on the controller node 105, 110 and retrieved through the data module 108, 113. The set of random bytes may be generated by a random number generation algorithm as part of the hint package generation component, or by a request to an external random number generation service (not shown).

The hint bytes may be passed to a hash value generation component 222 and act as a seed value for a hash algorithm. In some implementations, the hash value generation component may execute a one-way hash algorithm, such as the SHA-256 cryptographic hash algorithm, seeded with the hint bytes and the shared secret value that corresponds to the shared secret version value included in the hint bytes. The anti-takeover code module 220 may then for example, set the anti-takeover code to a value equal to the least significant 12 bytes of the hash value generated by the hash value generation component 222. The generated anti-takeover code, hint bytes, or both may be passed to the data module 108, 113 for persistent storage on the controller, to the communication module 225 for transmission to a slave node 210, or both.

The parsing module 230 may be configured to process node information, byte streams, strings received from the presentation module 106, 111, the data module 108, 113 (e.g., See FIG. 1), the anti-takeover code module 220, and the communications module 225. In some embodiments, the parsing module includes a node information frame parser for parsing node information received from a slave node 210 by the node communication component 226 when, for example, a node is to be included in the controller network 102 (e.g., see FIG. 1), or upon request. A byte parser 340 may parse byte streams, such as a set of hint bytes, received from a slave node 210 for use in determining, for example, whether the node already belongs to a controller network or for the generation of an anti-takeover code by the anti-takeover code module 220. In addition, a string parser 340 may parse messages received from other nodes or modules, or provide strings parsed from message data to other modules, such as the presentation module 106, 111.

Still referring to FIG. 2, in some embodiments, an example slave node 115 includes a code compare module 245, a command processor module 250, an optional routing module 255, an application programming interface mapping module 260, a communication module 265, a command class application programming interface 270, one or more command classes 275, and an exclusion detection component 285. The code compare module 245 may compare a received anti-takeover code value with a stored anti-takeover code value requested from the data module 108, 113 (e.g., see FIG. 1), at least in part, to determine whether to change to an unprotected mode, unhobble the peripheral, such as by returning a complete set of available device command classes in response to a node information request, or both. An optional routing module 255 may operate as discussed previously.

In some implementations, a command class application programming interface may be provided such that controller nodes can send commands to the communication module 265. Commands received by the communication module 265 in accordance with application programming interface may be passed to the application programming interface mapping module 260 that maps the command class application programming interface 270 command to the corresponding proprietary device command. The mapped device command is then sent to the command processor module 250 for processing and handling.

An exclusion detection component 285 may detect a message received as a result of a planned network disconnect event. This message may be generated by a controller node 105, 110 (e.g., see FIG. 1) as a result of a selection event related to planned removal of a peripheral device from the network. In addition, an exclusion detection component 285 may determine that a slave node peripheral device 115 has been removed based on sensing conditions associated with an exclusion event, such as the absence of communication from a controller node.

Communication between devices may be carried out by a set of commands organized into one or more command classes. Command classes 275 may include a fundamental grouping of commands, including commands implementing specific functionality in a peripheral device. A peripheral device generally contains a number of different functionalities and includes logical grouping of functions that are not command classes 275. Tailored functionality of a device may be achieved by including appropriate command classes 275 for selected devices. Vendors may thusly provide devices with features differentiating their product in the marketplace while at the same time achieving a high degree of interoperability. The set of command classes 275 may include, for example, device command classes 276 and anti-takeover command classes 277. The device command classes 276 may include the available device services. The anti-takeover command classes 277 may include the command classes specific to the anti-takeover mechanisms.

Figure 3:
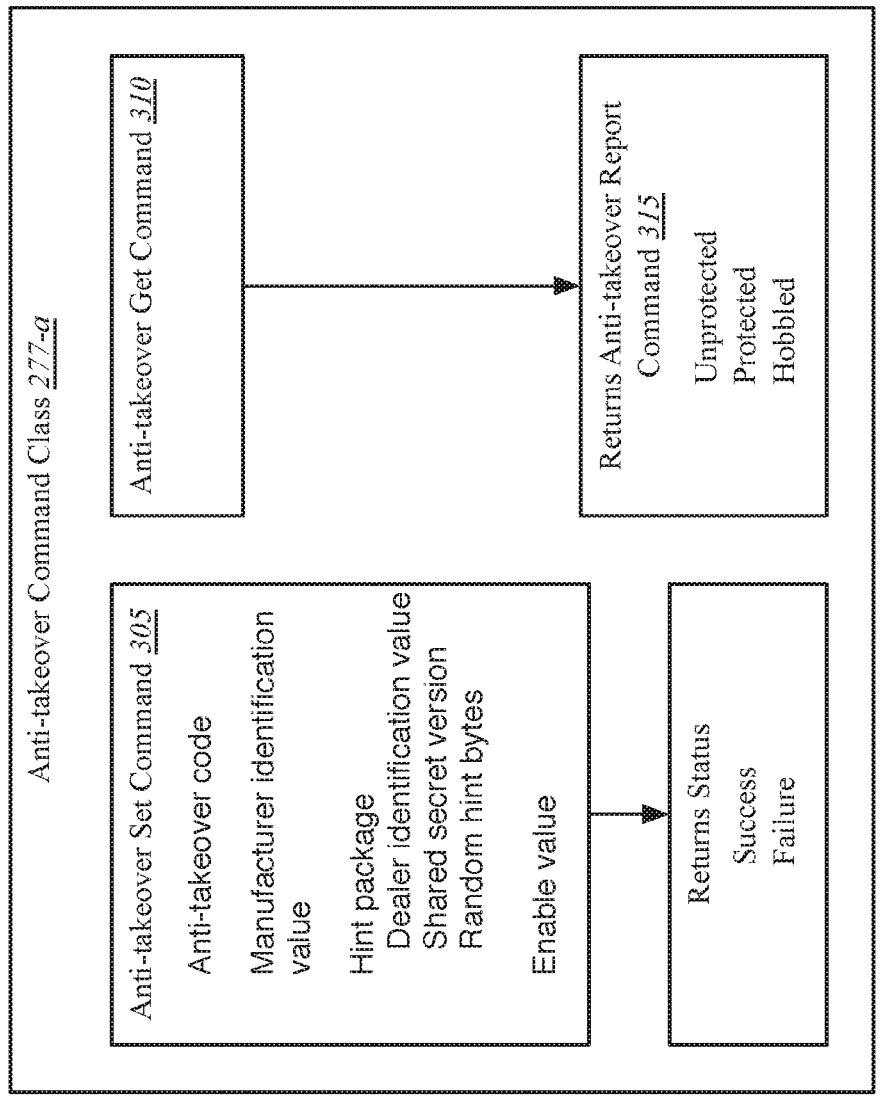
FIG. 3 is a block diagram of an exemplary anti-takeover command class for facilitating the anti-takeover functionality of the slave node of FIG. 2.

The anti-takeover command class may be used to disable a subset of supported command classes in a device if the device is being hobbled, such as when a device is being excluded from a controller network. The anti-takeover command class may couple the peripheral device to one or more controller networks and render it functionally limited if it is removed from its current network without being unprotected in advance of exclusion. Referring now to FIG. 3, anti-takeover command classes 277-a may include, for example, an anti-takeover set command 305 and anti-takeover get command 310. The anti-takeover set command may be structured with the following arguments:

ANTITAKEOVER_SET (anti-takeover code, manufacturer identification value, hint package, enable value)

The anti-takeover get command may be structured such that no arguments are included, returning an anti-takeover report that includes:

manufacturer identification value;
shared secret version value;
dealer identification value;
random hint bytes; and
protection state value In some instances, a shared secret version value, a network identification value, such as a dealer identification value, and a random number, such as a series of random hint bytes, are combined into a hint package as a single byte stream. The protection state value returned may be one of the group of unprotected, protected, or hobbled, with each having the meaning described previously. A node information report request command 315 may be available for all protection state conditions, although the hobbled condition may return a sub-set of the available command classes that would otherwise be returned if the protection state value were set to unprotected or protected. For example, the node information frame may then no longer advertise support of the protected command classes, but only advertise support of the anti-takeover command class and other non-device specific device command classes so long as the device remains in a hobbled state. The device may further fail to process protected commands while remaining in the hobbled state in a foreign network. Re-inclusion in the network where the device was originally protected may provide an automated method for a state modification to an unprotected state.

Figure 4A:
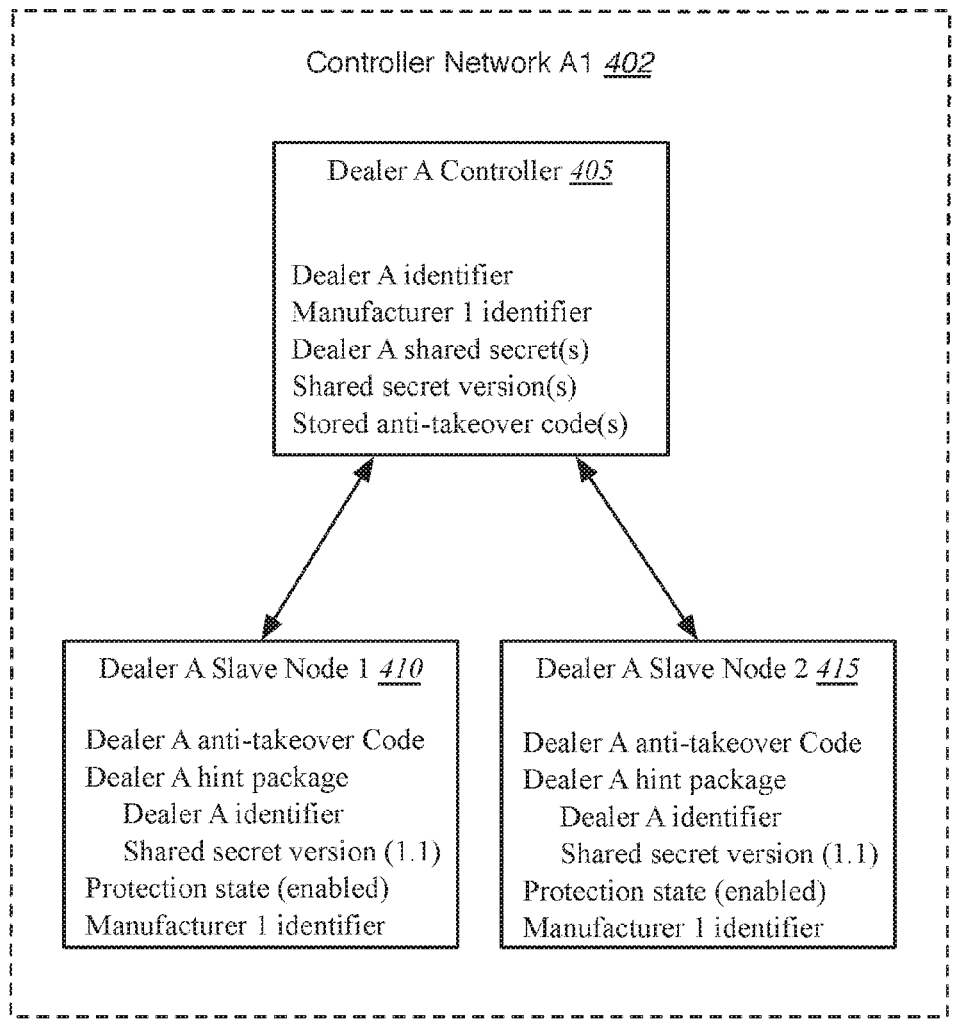
FIG. 4A is a block diagram of an exemplary dealer-specific controller network of FIG. 1.

Referring now to FIG. 4A, in some embodiments, a controller network 402 is associated with an entity such as a dealer that may be involved in the selling, distribution, or servicing of one or more devices 405, 410, 415 included in such controller networks 402. For purposes of this application, the term "identifier" means "identification value." For purposes of this application, the term "enabled" when used to refer to a protection state means "protected." In this example, the dealer is identified as Dealer A, and the network is identified as a first controller network 402 associated with Dealer A, namely A1. At the time Dealer A slave nodes 410, 415, are included in controller network A1 402, Dealer A controller 405 may generate a hint package and an anti-takeover code, then transmit the hint package, anti-takeover code, and manufacturer identifier to the slave nodes 410, 415. In some instances, the hint package includes a dealer identifier, in this case, a value associated with Dealer A. In addition, the transmission may include a command to set the protection state to protected. In certain implementations, a shared secret associated with and stored on multiple Dealer A controller devices is used to seed an anti-takeover code generation algorithm. Generated anti-takeover codes may be stored on controller nodes where such codes may be used to unprotect peripheral devices automatically without first generating a node information request and regenerating the anti-takeover code based on the information in the request response.

One or more Dealer A controller devices may receive a new shared secret from time to time. In some cases, protected devices that received an anti-takeover code seeded with the old shared secret may not have received an updated anti-takeover code seeded with the new shared secret. To address this inconsistency, controller devices may maintain a history of shared secrets with a unique version number associated with each shared secret. Further, shared secrets may be distinct for different manufacturers. The controller device may maintain distinct sets of manufacturer associated shared secrets and corresponding shared secret version values. Thus, peripheral devices protected with older shared secrets may be unprotected, unhobbled, or both when joining a network with a controller node that includes the older shared secret by providing the shared secret version value with the network identifier, such as a dealer identifier, and the manufacture identifier to the controller device.

Figure 4B:
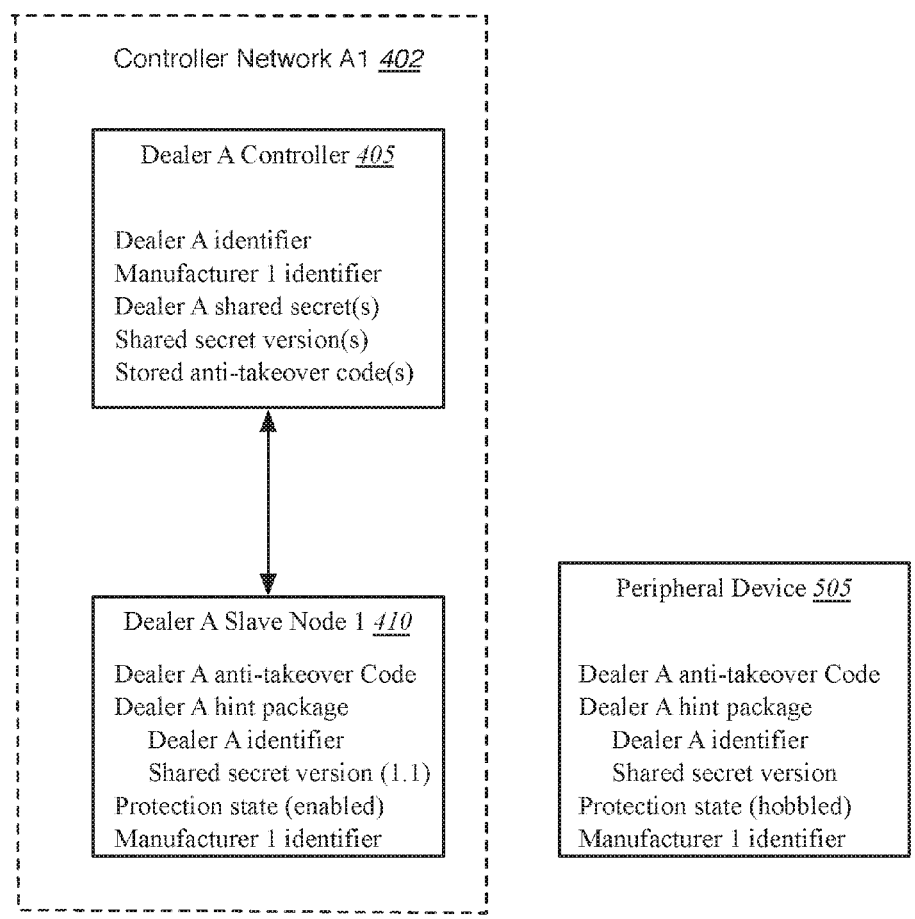
FIG. 4B is a block diagram of the exemplary dealer-specific controller network of FIG. 4A with former slave node 2 excluded from the network.

Referring now to FIG. 4B, in some embodiments, Dealer A Slave Node 2 415 (e.g., see FIG. 4A) transitions to a hobbled peripheral device 505 upon the occurrence of an exclusion event relating to controller network A1 402. Hobbled peripheral device 505 may maintain in memory the Dealer A anti-takeover code, the hint package including the Dealer A identifier, the shared secret version, and the randomly generated value, and the manufacturer identifier. The protection state may be set to hobbled in response to detection of an exclusion event, such as the absence of communication with a controller node or receiving an exclusion message from a controller node. The hobbled peripheral device 505 may be automatically unprotected, hobbled, or both when re-included in the controller network A1. Upon detection of an inclusion event, the Dealer A controller 405 may transmit an anti-takeover set command setting the protection state value to unprotected and including the controller stored anti-takeover code, thus unhobbling the device.

Figure 4C:
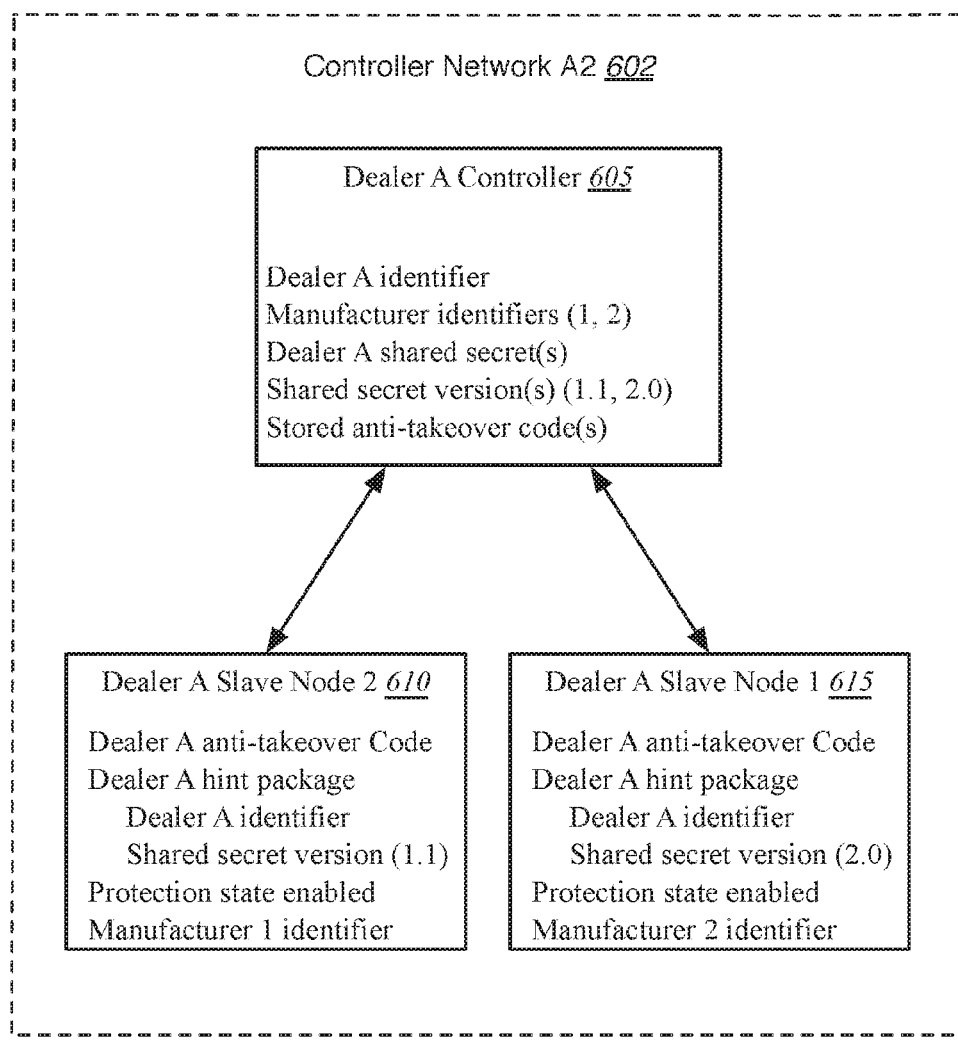
FIG. 4C is a block diagram of another exemplary dealer-specific controller network of FIG. 1 with former slave node 2 of FIG. 4B included in the network.

A peripheral device formerly acting as a slave node in a dealer network may be automatically unhobbled when added to another network associated with the same dealer. Referring now to FIG. 4C, the hobbled peripheral device 505 formerly acting as Dealer A slave node 2 in controller network A1 402 (e.g., see FIG. 4B) is included in controller network A2 602 associated with the same Dealer A. This may occur, for example, where Dealer A decommissions a peripheral device at one location and recommissions the device at a different location. In this example, the hobbled peripheral device 505 becomes Dealer A slave node 2 610 in controller network A2 602. The dealer A controller device 605 in this network is associated with two different manufacturers, each having its own associated dealer-specific shared secrets and shared secret versions. Upon detection of an inclusion event relating to the now-designated Dealer A slave node 2 610, the Dealer A controller 605 may obtain the node information from Dealer A slave node 2 610, parse the node information, and determine if the manufacturer identifier and dealer identifier of Dealer A slave node 2 610 match the values stored in the Dealer A controller 605 memory. Here, the manufacturer identifier of Dealer A slave node 2 610 matches one of the manufacturer identifiers of Dealer A controller 605 such that the unhobbling process proceeds. In some embodiments, the unhobbling process may proceed without comparing network identification values or manufacturer identification values.

The dealer identifier value Dealer A slave node 2 610, here Dealer A identifier, matches the dealer identifier value on the Dealer A controller 605. In some embodiments, this dealer identifier is included as a value within a hint package parsed by the controller device. There may be multiple versions of dealer specific shared secrets. In this example, there are two different shared secrets stored on the Dealer A controller 605, namely, version 1.1 and version 2.0. Dealer A slave node 1 615 received an anti-takeover code seeded with the version 2.0 shared secret associated with Dealer A. Dealer A slave node 2 610 received an anti-takeover code seeded with the version 1.1 shared secret associated with Dealer A as part of joining controller network A1 402. Since Dealer A slave node 2 610 has not been a part of controller network A2, Dealer A controller 605 has not stored the anti-takeover code for Dealer A slave node 2 610, and may therefore generate the anti-takeover code based on the hint package received and retrieval of the appropriate shared secret from Dealer A controller 605 memory. Upon generating the anti-takeover code, Dealer A controller 605 may store the anti-takeover code in memory, and transmit an anti-takeover set command to Dealer A slave node 2 610 that includes the anti-takeover code and the hint package, and sets the protection state to unprotected, thus automatically unhobbling the peripheral device. Dealer A controller 605 may subsequently generate an updated anti-takeover code seeded with the version 2.0 shared secret, store the updated shared secret, and transmit the updated shared secret and corresponding hint package to Dealer A slave node 2 610.

Figure 4D:
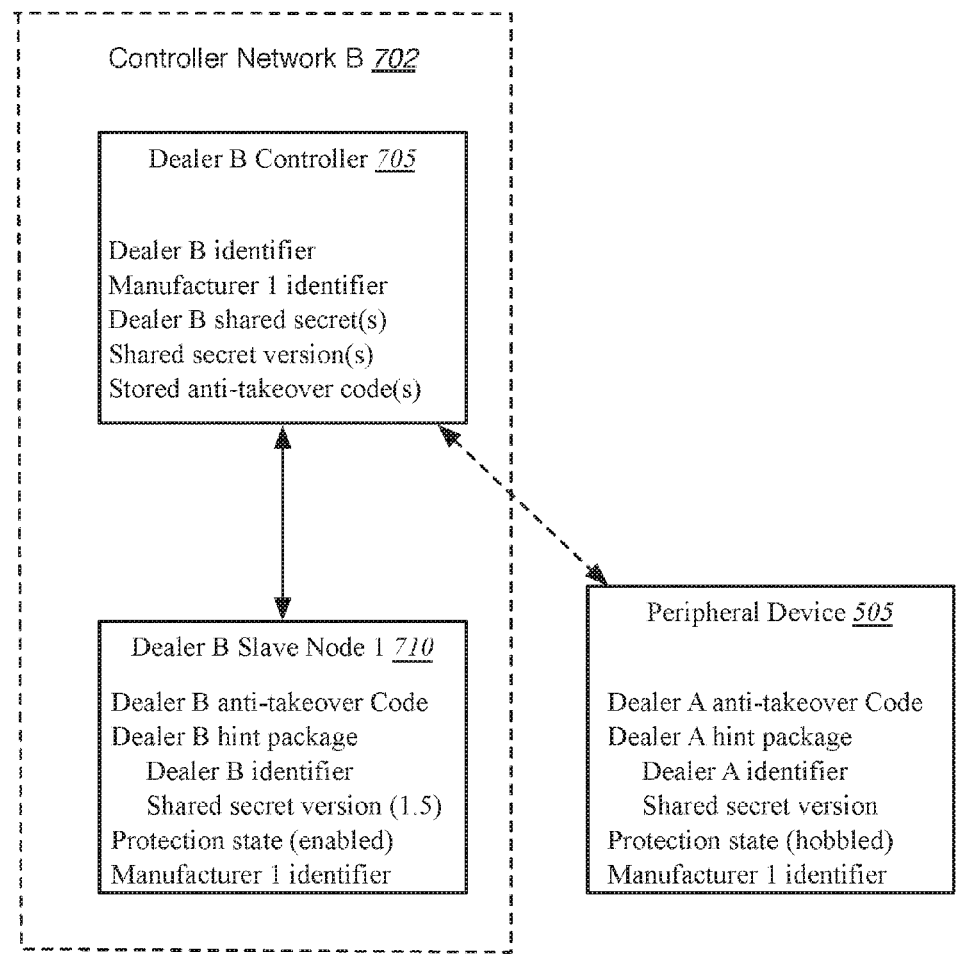
FIG. 4D is a block diagram of another exemplary dealer-specific controller network of FIG. 1 with former slave node 2 of FIG. 4B in a hobbled state excluded from a non-matching dealer network.

A peripheral device formerly acting as a slave node in a dealer network may not be automatically unhobbled when added to another network associated with a different dealer. Referring now to FIG. 4D, the hobbled peripheral device 505 formerly acting as Dealer A slave node 2 in controller network A1 402 (e.g. See FIG. 4B) is included in controller network B 702 associated with the Dealer B. This may occur, for example, where Dealer B attempts to commission a device formerly deployed by Dealer A within a Dealer A network into a Dealer B network. In this example, the hobbled peripheral device 505 may perform handshake activities and negotiations determining whether unhobbling may occur. The dealer B controller device 705 in this network is associated with the same manufacturer as peripheral device 505. Upon detection of an attempted inclusion event relating to the peripheral device 505, the Dealer B controller 705 may obtain the node information from peripheral device 505, parse the node information, and determine if the manufacturer identifier and dealer identifier of peripheral device 505 match the values stored in the Dealer B controller 705 memory. Here, the manufacturer identifier of Dealer A slave node 2 610 matches one of the manufacturer identifiers of Dealer A controller 605 such that the unhobbling process proceeds. In some embodiments, the attempted unhobbling process may proceed without comparing network identification values or manufacturer identification values.

Figure 4E:
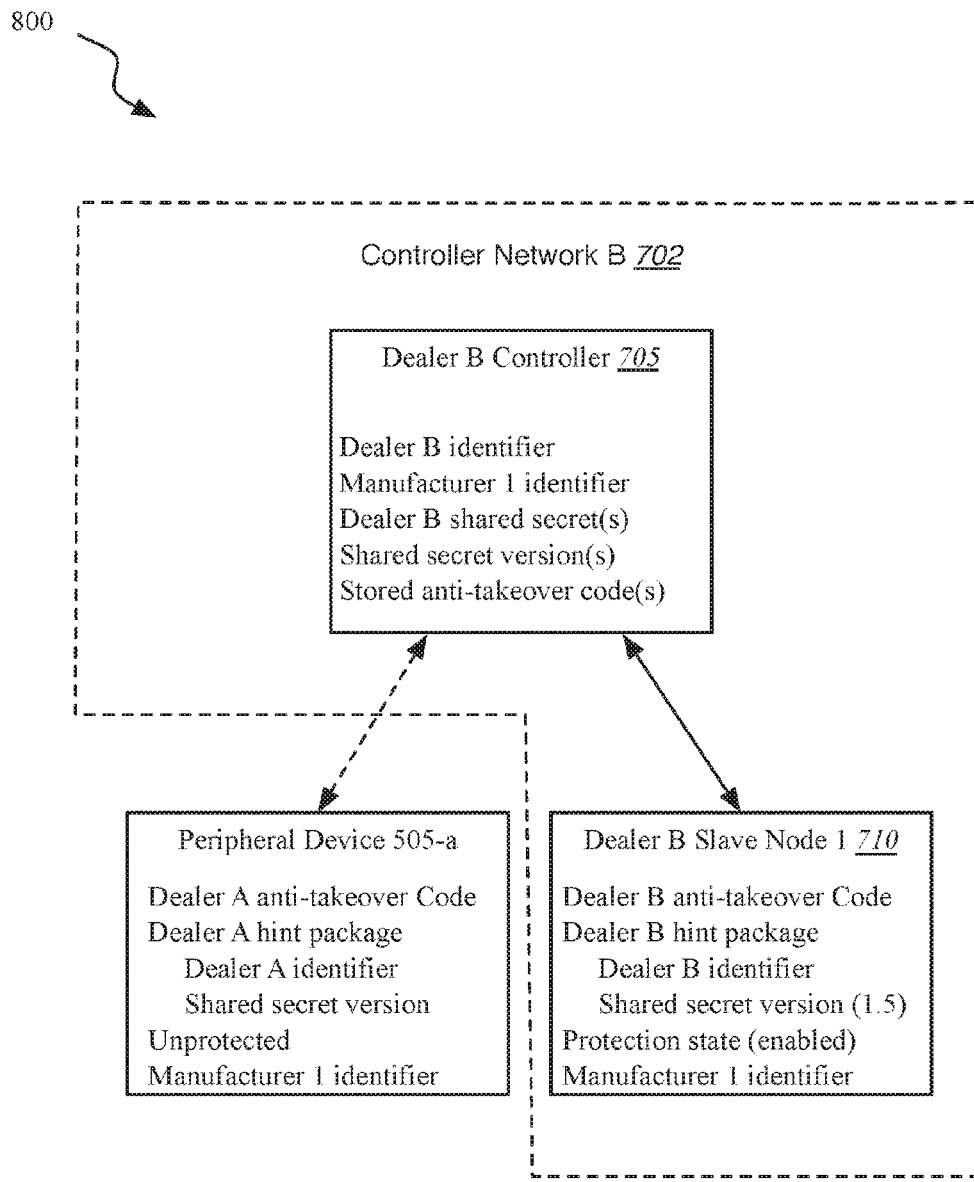
FIG. 4E is a block diagram of the exemplary dealer-specific controller network of FIG. 4D with unprotected former slave node 2 of FIG. 4B negotiating inclusion in the network.
Figure 4F:
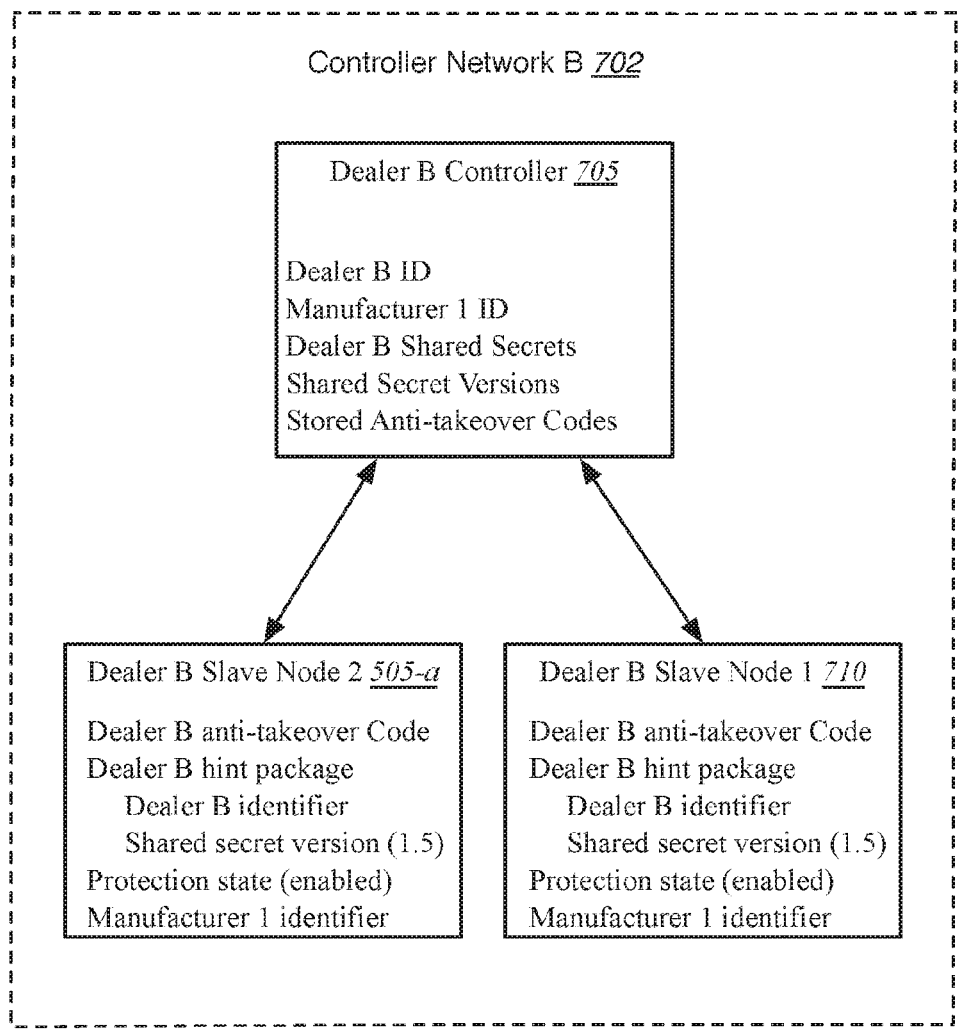
FIG. 4F is a block diagram the exemplary dealer-specific controller network of FIG. 4D with unprotected former slave node 2 of FIG. 4B included as a new protected slave node of the network.

The dealer identifier value peripheral device 505, here Dealer A identifier, does not match the dealer identifier value on the Dealer B controller 705. In some embodiments, this dealer identifier is included as a value within a hint package parsed by the controller device. At this point, the unhobbling process may cease, and the peripheral device may remain in a hobbled state. In some embodiments, unhobbling of peripheral device 505 may not occur until the device is included in a network where the controller device includes the same shared secret used to generate the anti-takeover code stored on the peripheral device 505. In some implementations, an anti-takeover code generation and comparison on the controller device may not occur unless manufacturer identifier, the dealer identifier, or both on the controller device match the manufacturer identifier, the dealer identifier, or both on the peripheral device 505. In some instances, this may be accomplished by recommissioning peripheral device 505 in a Dealer A network. Additionally or alternatively, peripheral device 505 may be unhobbled by replacing Dealer B controller 705 with a Dealer A controller device, thus transforming the network to a Dealer A network. Referring now to FIGS. 4E and 4F, peripheral device 505 was set to an unprotected state prior to being excluded from controller network A1 402. When a device is in an unprotected state, the device may maintain a persistent unhobbled condition, such as where all command classes may be available, and may be added to controller network B 702 without negotiation. Upon detection of an inclusion event, Dealer B controller 705 may generate a hint package, generate an anti-takeover code, store the anti-takeover code in memory, and transmit an anti-takeover set command to peripheral device 505 that includes the anti-takeover code, the hint package, and the manufacturer identifier, and sets the protection state to protected. In addition, and alternatively, peripheral 505 may remain in an unprotected state without limitations to command class availability.

Referring now to FIG. 5A through FIG. 5D, a general method 1000 of using various embodiments of the systems and/or devices described herein is shown. For example, method 1000 may be implemented utilizing the various embodiments of system 100, portable controller node 105, static controller node 110, slave node 115, controller application module 107, 112, 205, slave application module 210, sensor 125, feature controller 126, router 127, meter 128, and/or other devices and/or components.

Figure 5A:
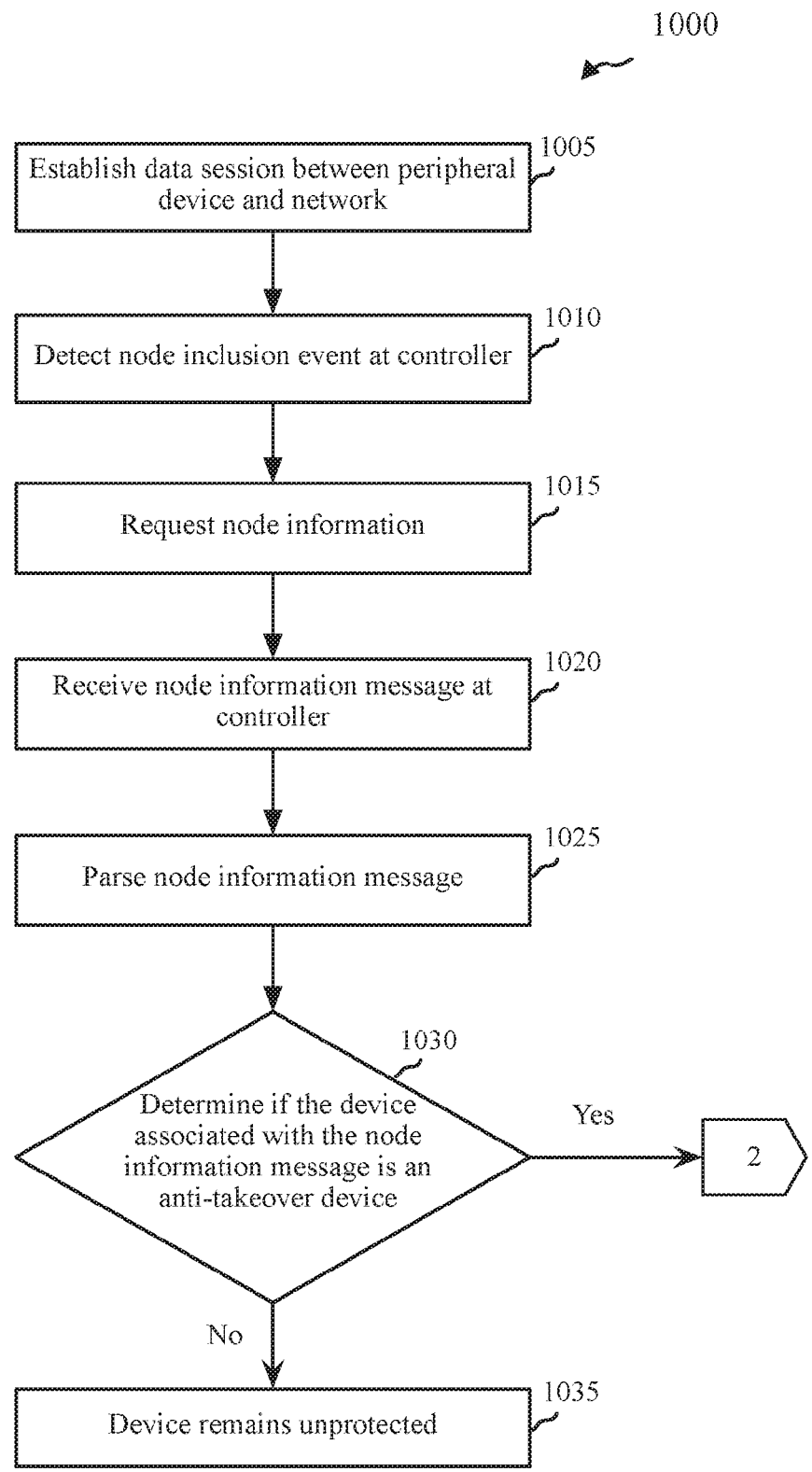
FIG. 5A through FIG. 5B are flow diagrams illustrating a method for negotiating protection states between network nodes according to various embodiments.

Referring to FIG. 5A, at block 1005, a data session may be established between the communication module 265 (e.g., see FIG. 2) of a peripheral device and a network. Peripheral devices may include, for example, a sensor 125, feature controller 126, router 127, meter 128, and the like. The network may be a controller network 102. The established data connection may be preceded by a handshake between controller node 105, 110, and a peripheral device.

At block 1010, a controller may detect an inclusion event. The controller may be a portable controller node 105 or a static controller node 110. Inclusion event detection may include an inclusion detection component 216 (e.g., see FIG.

2) receiving a message from the peripheral device attempting to join the network, detecting a change to the physical network, receiving a message from a peripheral device or a controller device indicating there is a new peripheral device attempting to join the network, and the like.

At block 1015, in some instances, the controller node application module 107, 112, 205 (e.g., see FIG. 1 and FIG. 2) may request node information from the peripheral device pursuing network inclusion. The request may take the form of an command class application programming interface call to the communication module 265 of the peripheral device 210. The command processor module 250 of the peripheral device 210 may process the node information request and return a node information message to the requesting application module 205.

At block 1020, the controller may receive the node information message at the node communication component 226 (e.g., see FIG. 2), and the node communication component 226 may pass the node information message to the parsing module 230. At block 1025, the parsing module 230 may parse the node information message, obtaining the current protection state value for the peripheral device.

At block 1030, the controller node application module 107, 112, 205 (e.g., see FIG. 1 and FIG. 2) may determine if the device associated with the node information message is an anti-takeover device. This determination can be made by, for example, evaluating each of the parsed node information values and determining if any of these values are associated with an anti-takeover device. If the determining step 1030 determines that the device is not an anti-takeover device, then it may remain in an unprotected state 1035. If the determining step 1030 determines that the device is an anti-takeover device, the method proceeds.

Figure 5B:
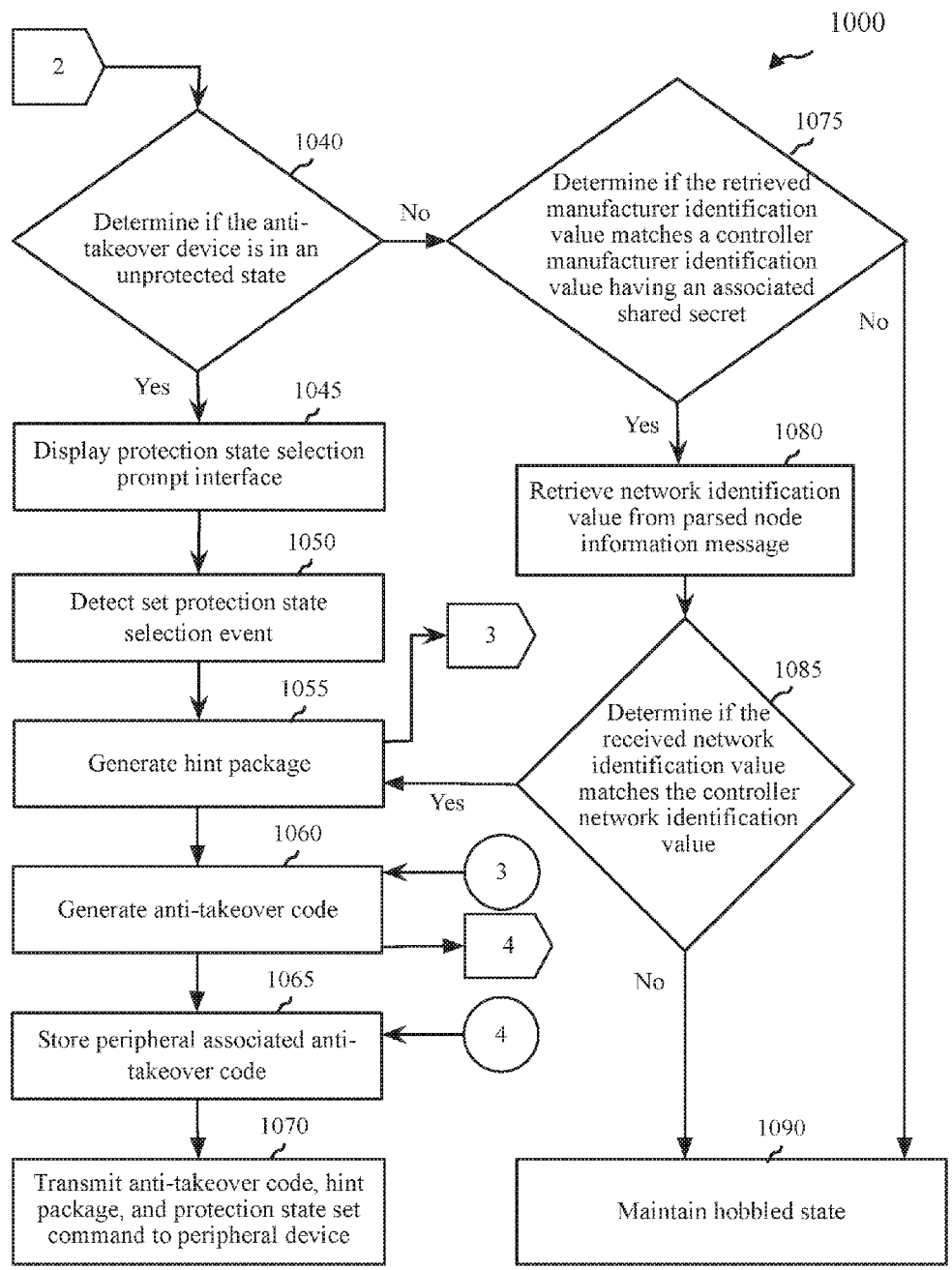

Referring now to FIG. 5B, at block 1040, the controller node application module 107, 112, 205 (e.g., see FIG. 1 and FIG. 2) determines if the anti-takeover device is in an unprotected state. This determination can be made by, for example, evaluating the parsed node information value associated with the current protection state. In some embodiments, the protection states include an unprotected state, a protection enabled state, and a hobbled state.

If the evaluation of the protection state value indicates the current protection state is unprotected, then a protection state selection prompt interface may be displayed 1045. A set protection state select event may occur in response to the display of the protection state selection prompt 1045. At block 1050, the controller node application module 107, 112, 205 (e.g., see FIG. 1 and FIG. 2) may detect the protection state selection event, triggering the generation of one or more protection related values.

Figure 5C:
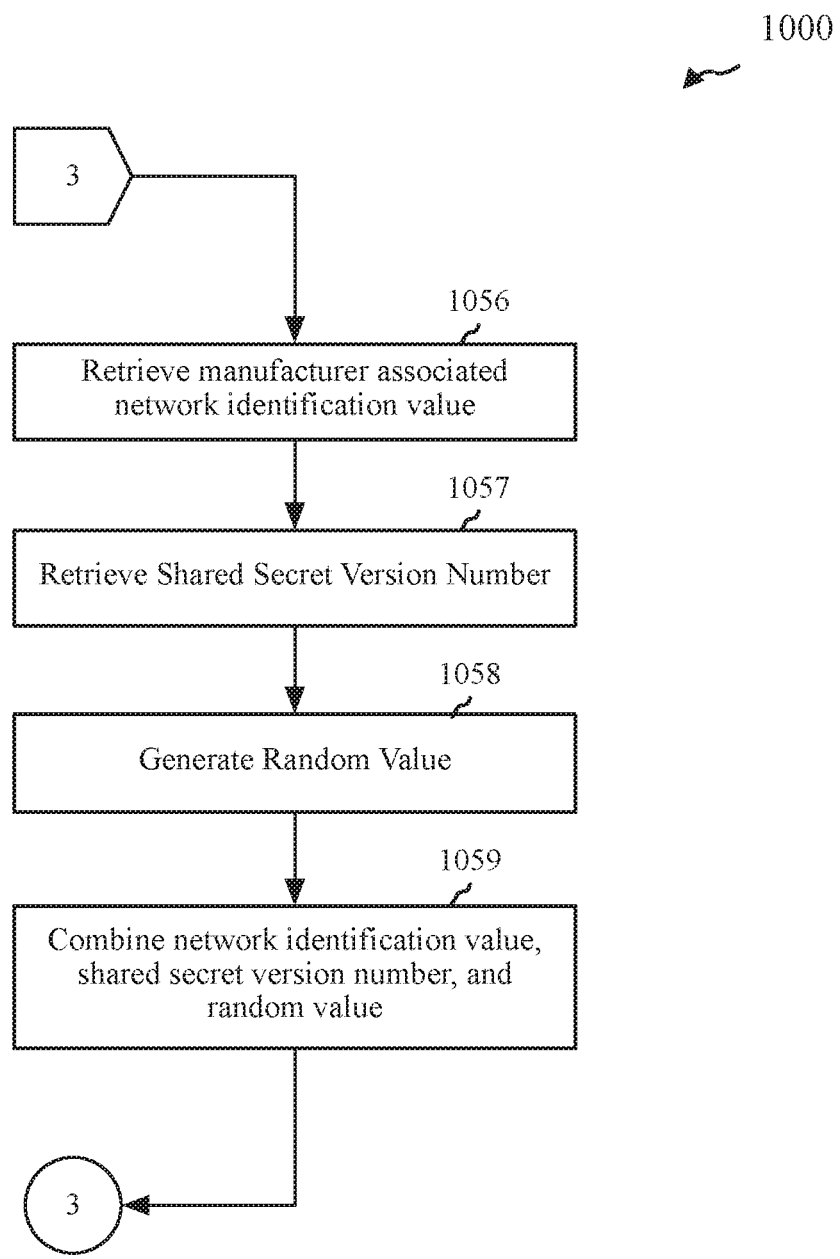
FIG. 5C is a flow diagram illustrating a method for generating a hint package as part of the protection negotiation of FIG. 5B according to various embodiments.

At block 1055, an hint package may be generated. Referring now to FIG. 5C, in some embodiments, at block 1056, the manufacturer associated network identification value may be retrieved from the controller 105, 110 (e.g., see FIG. 1) memory. The network identification value may be associated with a particular entity, such as, for example, a dealer. The network identification value may be used by multiple controllers located in different networks associated with the same dealer. The network identification value may also be associated with a manufacturer.

At block 1057, the shared secret version number associated with the shared secret may be retrieved from the parsed node information message. If the parsed node information message does not include a shared secret version, the shared secret version associated with the latest shared secret corresponding to the manufacture associated network identification value may be retrieved from controller 105, 110 (e.g., see FIG. 1) memory.

The anti-takeover code module 220 (e.g., see FIG. 2) may generate a random value 1058, such as a random number, for inclusion in the hint package. In certain implementations, this random value is a random series of bytes. At block 1059, the hint package generation component 221 may combine the network identification value, the shared secret version number, and the random value into a hint package. In some embodiments, the hint package is a series of bytes. The first byte may encode the network identifier value, such as a dealer identifier. The second byte may indicate the version associated with the shared secret used to seed the algorithm generating the anti-takeover code. The remainder of the bytes may be randomly generated by the anti-takeover code module 220.

Figure 5D:
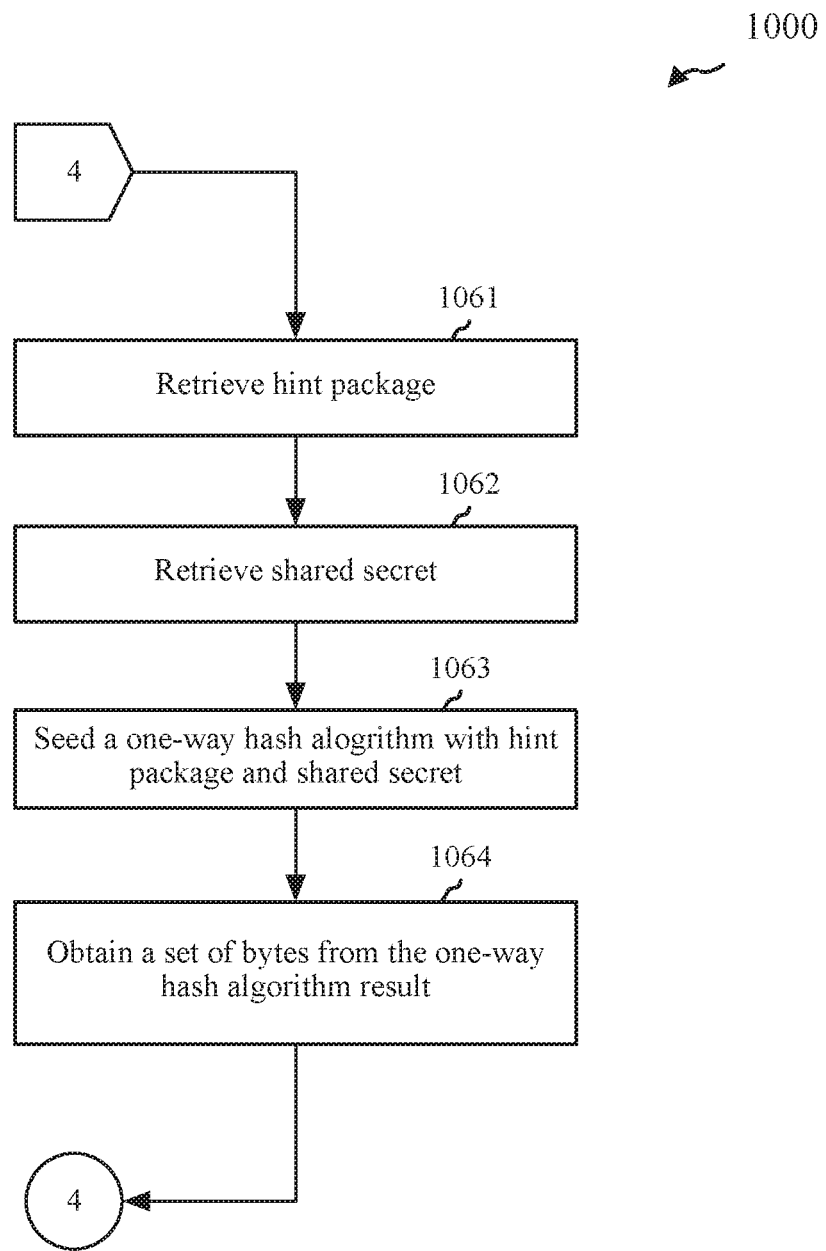
FIG. 5D is a flow diagram illustrating a method for generating an anti-takeover code as part of the protection negotiation of FIG. 5B according to various embodiments.

Referring again to FIG. 5B, at block 1060, a process for generating an anti-takeover code may be initiated that includes the results of the hint package generation. Referring now to FIG. 5D, at block 1061, the hint package may be retrieved from the parsed node information message. If the parsed node information message does not include a hint package, the hint packaged generated at block 1055 may be retrieved.

At block 1062, a shared secret may be retrieved from controller 105, 110 (e.g., see FIG. 1) memory. In some embodiments, one or more common shared secrets reside on multiple controller nodes 105, 110 located on different controller networks associated with a common dealer identifier. The retrieval of a particular shared secret may involve determining the shared secret associated with a particular manufacturer, a particular dealer, or both. Further, the selection of the shared secret may involve identifying a particular shared secret version.

At block 1063, a one-way hash function, such as, for example, the SHA-256 cryptographic hash algorithm, may be seeded with the hint package retrieved at block 1061 and the shared secret retrieved at block 1062. At block 1064 a set of bytes are obtained from the result of the one-way hash algorithm. In some instances, some number of least significant bytes are obtained, such as the least significant 12 bytes.

Referring again to FIG. 5B, the controller node application module 107, 112, 205 (e.g., see FIG. 1 and FIG. 2) may store the peripheral associated anti-takeover code in controller 105, 110 memory. The controller node may automatically unhobble the associated peripheral devices using the stored anti-takeover code. At block 1070, the anti-takeover code, hint package, and protection state set command may be transmitted to the peripheral device. The peripheral device may store this information and return it as part of a node information report in response to node information requests.

Referring again to block 1040, the controller node application module 107, 112, 205 (e.g., see FIG. 1 and FIG. 2) determines if the anti-takeover device is in an unprotected state. If the evaluation of the protection state value indicates the current protection state is not unprotected, then a determination is made if the retrieved manufacturer identifier matches a controller manufacturer identifier having an associated shared secret 1075. If the result of this determination at block 1075 is the lack of a match, then the peripheral device will maintain a hobbled state 1090.

If the result of this determination at block 1075 is a match, then the network identification value associated with the peripheral device may be retrieved from the parsed node information message 1080 and a determination made whether the received network identification value matches the controller network identification value 1085. If the determining step of block 1085 identifies the values as matching, then the hint package and anti-takeover code may be generated, and the device may be unhobbled 1055, 1060, 1070. If the determining step of block 1085 identifies the values as non-matching then the peripheral device may maintain a hobbled state 1090.

Figure 6:
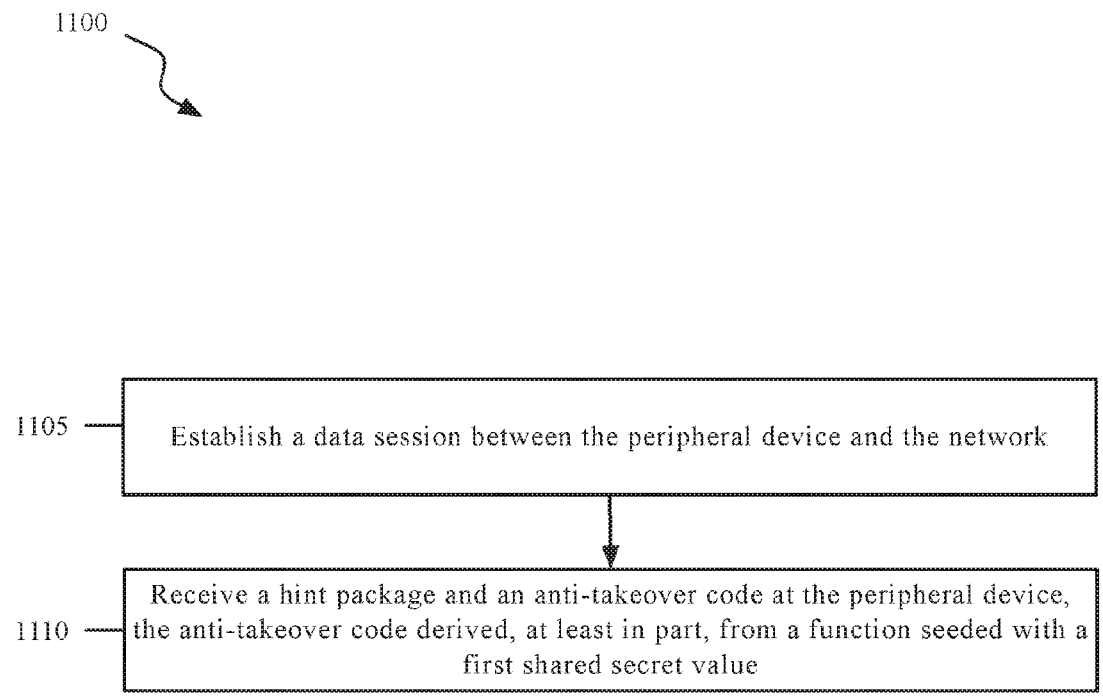
FIG. 6 is a flow diagram illustrating an exemplary method for a peripheral device to join the network of FIG. 1.
Figure 7:
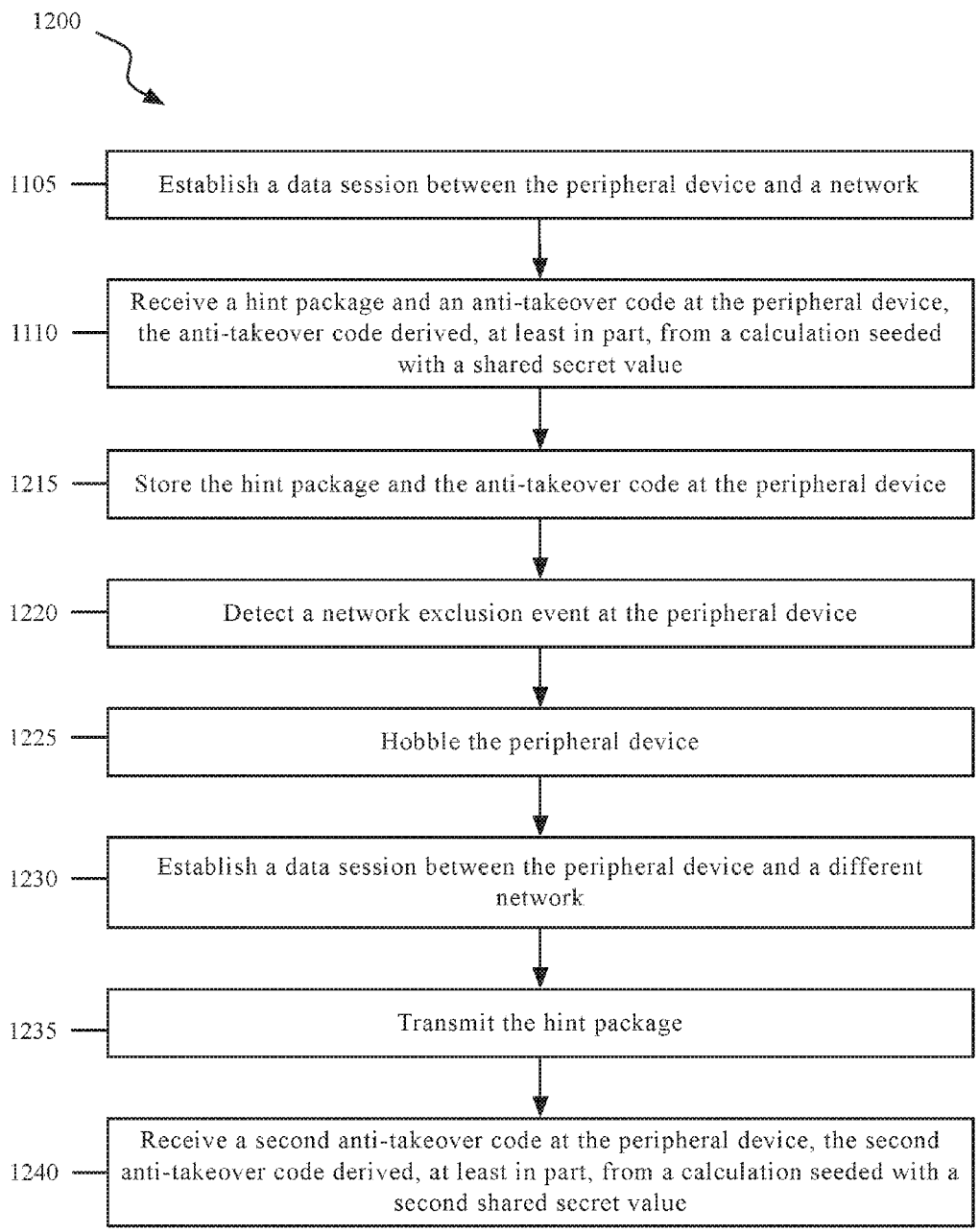
FIG. 7 is a flow diagram illustrating another exemplary method for a peripheral device to join the network of FIG. 1.
Figure 8:
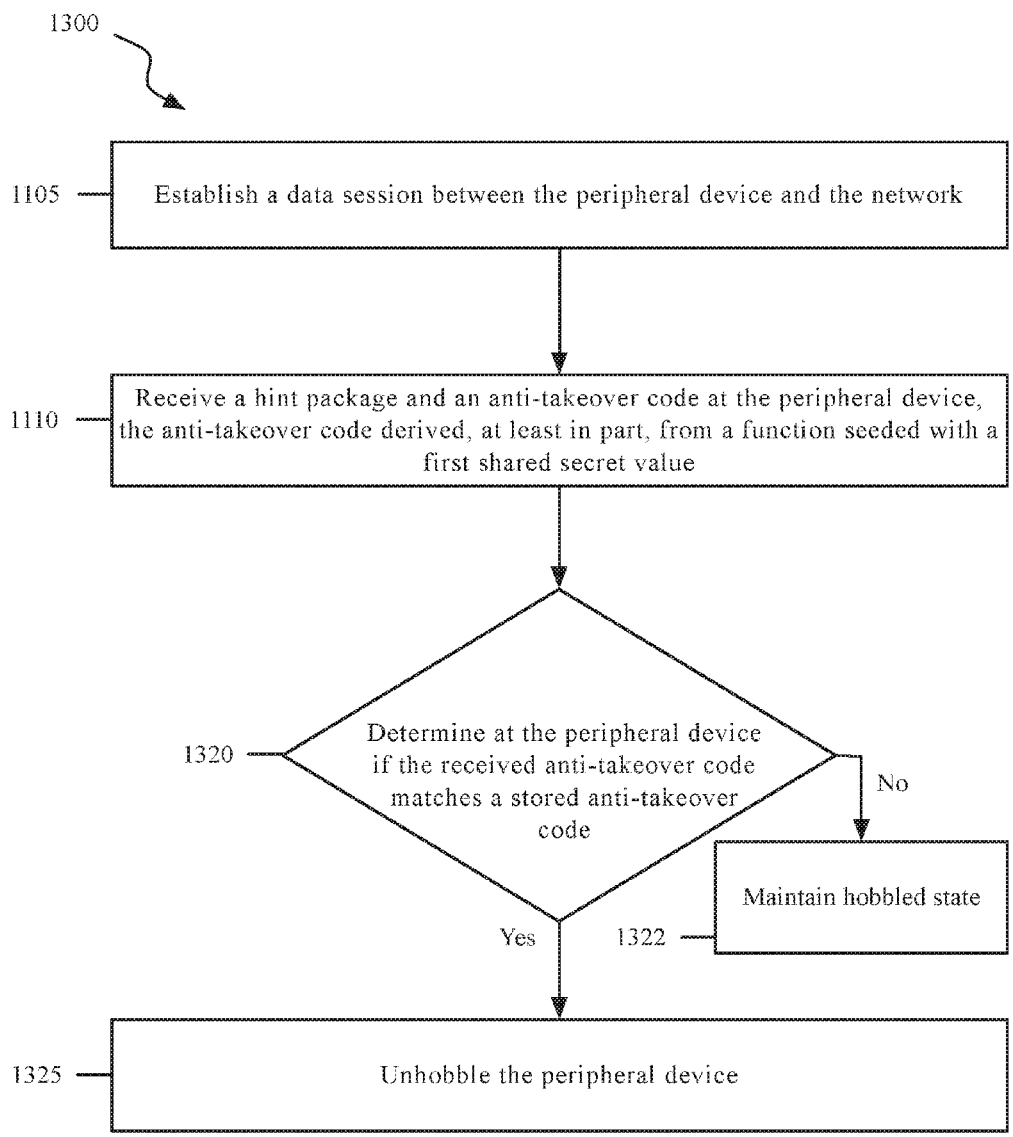
FIG. 8 is a flow diagram illustrating an exemplary method for a peripheral device to join the network of FIG. 1 in protected mode.

Referring now to FIG. 6 through FIG. 8, a series of flowcharts illustrating methods 1100, 1200, 1300 for implementing an anti-takeover mechanism is shown in accordance with various embodiments. Methods 1100, 1200, and 1300 may be implemented utilizing the various embodiments of system 100, portable controller node 105, static controller node 110, slave node 115, controller application module 107, 112, 205, slave application module 210, sensor 125, feature controller 126, router 127, meter 128, and/or other devices and/or components. With reference now to FIG. 6, initially, at block 1105, the system may establish a data session between the peripheral device and the network. For example, a data session may be established between the communication module 265 (e.g., see FIG. 2) of a peripheral device and a network. Peripheral devices may include, for example, a sensor 125, feature controller 126, router 127, meter 128, and the like. The network may be a controller network 102. The established data connection may be preceded by a handshake between controller node 105, 110, and a peripheral device. In some embodiments, the data connection may be a wireless connection.

At block 1110, the peripheral device may receive a hint package and an anti-takeover code. In some implementations, the anti-takeover code is derived, at least in part, from a function seeded with a shared secret value. The shared secret value may be an undiscoverable values shared by a plurality of controller devices on one or more related networks, such as a dealer network. The receipt of the hint package and anti-takeover code may be in response to the inclusion detection component 216 of node detection module 215 detecting a network inclusion event relating to the peripheral device.

Referring now to FIG. 7 a block diagram of an embodiment of FIG. 6 is shown. In addition to the steps 1105 and 1110 of FIG. 6, the peripheral device may store the hint package and the anti-takeover code 1215. The hint package may be later retrieved and provided to controller nodes 105, 110 (e.g., see FIG. 1) such that the controller nodes 105, 110 may generate an anti-takeover code as part of an unhobbling process. The anti-takeover code may be later retrieved by the peripheral device and compared against received anti-takeover codes as another part of the unhobbling process.

At block 1220, the peripheral device may be configured to detect a network exclusion event, such as when there is an absence of communication from a controller node 105, 110 (e.g., see FIG. 1). Detection by an exclusion detection component 285 may trigger the peripheral to obtain a hobbled state as described previously 1225.

At block 1230, a data session may be established between the peripheral device and another network. For example, a data session may be established between the communication module 265 (e.g., see FIG. 2) of a peripheral device and this second network where the second network includes one or more controller nodes 105, 110 (e.g., see FIG. 1) storing shared secrets, network identifiers, or both that differ from those stored on the controller nodes 105, 110 of the first network.

At block 1235, the peripheral device may transmit the hint package to a node on the network, such as a controller device 105, 110 (e.g., see FIG. 1) as part of an unhobbling process. In some embodiments, the hint package includes a network identification value, such as, for example, a dealer identifier, a shared secret version value, and a random value such as a series of randomly generated bytes. The transmission may be in response to a request taking the form of a command class application programming interface call to the communication module 265 of the peripheral device 210. The command processor module 250 of the peripheral device may process the node information request and return a node information message to the requesting application module 205.

At block 1240, the peripheral device may receive a second anti-takeover code. In some implementations, this second anti-takeover code is also derived, at least in part, from a function seeded with a shared secret value stored on a controller node device 105, 110 (e.g., see FIG. 1) of the second network. This shared secret value may be the same shared secret value as that used by the first network to generate the stored anti-takeover code, or it may be a different shared secret. The receipt of anti-takeover code may be a result of the anti-takeover code being generated by controller node in response to receiving a hint package from the peripheral device.

Referring now to FIG. 8 a block diagram of an embodiment of FIG. 7 is shown. In addition to the steps 1105 and 1110 of FIG. 7, the peripheral device may determine if the received anti-takeover code matches a stored anti-takeover code 1320 and in response, unhobble the peripheral device 1325, such as by enable one or more additional command classes based, at least in part, on the result of the determining step 1320. Alternatively, if no match is identified, the peripheral device may maintain a hobbled stated 1322.

Figure 9:
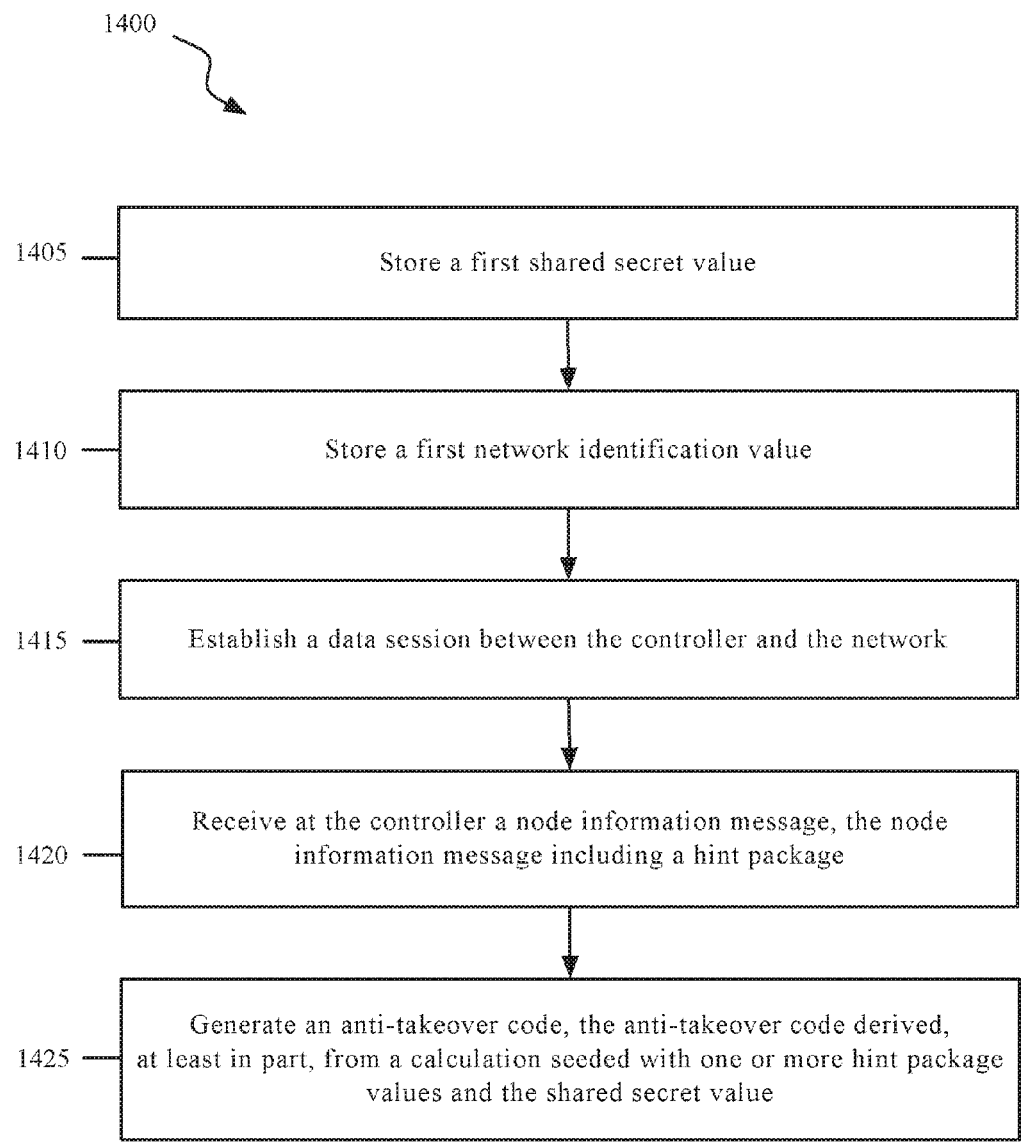
FIG. 9 is a flow diagram illustrating exemplary method for a controller device to negotiate with a node device in protected mode in the network of FIG. 1.

Referring now to FIG. 9, a general method 1400 for implementing an anti-takeover mechanism is shown in accordance with various embodiments. For example, method 1400 may be implemented utilizing the various embodiments of system 100, portable controller node 105, static controller node 110, slave node 115, controller application module 107, 112, 205, slave application module 210, sensor 125, feature controller 126, router 127, meter 128, and/or other devices and/or components. At block 1405, the controller node data module 108, 113, (e.g., see FIG. 1) may store a shared secret value. The shared secret value may be written to memory at the time of manufacturing, or after release from manufacturing. The shared secret value may be common across one or more controller nodes 105, 110 in one or more controller networks associated with a common network identification value.

At block 1410, the controller node data module 108, 113, (e.g., see FIG. 1) may store a network identification value. The network identification value may be written to memory at the time of manufacturing, or after release from manufacturing. The network identification value may be associated with an entity such as, for example, a dealer. The network identification value may be common across one or more controller nodes 105, 110 in one or more controller networks.

At block 1415, the system may establish a data session between the peripheral device and the network. For example, a data session may be established between the communication module 265 (e.g., see FIG. 2) of a peripheral device and a network. Peripheral devices may include, for example, a sensor 125, feature controller 126, router 127, meter 128, and the like. The network may be a controller network 102. The established data connection may be preceded by a handshake between controller node 105, 110, and a peripheral device. In some embodiments, the data connection may be a wireless connection.

At block 1420, the controller may receive a node information message at the node communication component 226 (e.g., see FIG. 2). The node information message may include a hint package. In some embodiments, the hint package includes a network identification value, such as, for example, a dealer identifier, a shared secret version value, and a random value such as a series of randomly generated bytes. The receipt of the hint package may be in response to the inclusion detection component 216 of node detection module 215 detecting a network inclusion event relating to the peripheral device.

At block 1425, the anti-takeover code module 220 (e.g., see FIG. 2) may generate an anti-takeover code. The anti-takeover code may be derived, at least in part, from a calculation seeded with one or more hint package values and the shared secret value. The shared secret may be retrieved from controller 105, 110 (e.g., see FIG. 1) memory. In some embodiments, one or more common shared secrets reside on multiple controller nodes 105, 110 located on different controller networks associated with a common dealer identification value. The retrieval of a particular shared secret may involve determining the shared secret associated with a particular manufacturer, a particular dealer, or both. Further, the selection of the shared secret may involve identifying a particular shared secret version.

The calculation may include a one-way hash function, such as, for example, the SHA-256 cryptographic hash algorithm, which may be seeded with one or more hint package values and the shared secret. In some embodiments, a set of bytes are obtained from the result of the one-way hash algorithm. Some number of least significant bytes may be obtained from the result, such as the least significant 12 bytes, which then may constitute the anti-takeover code.

Figure 10:
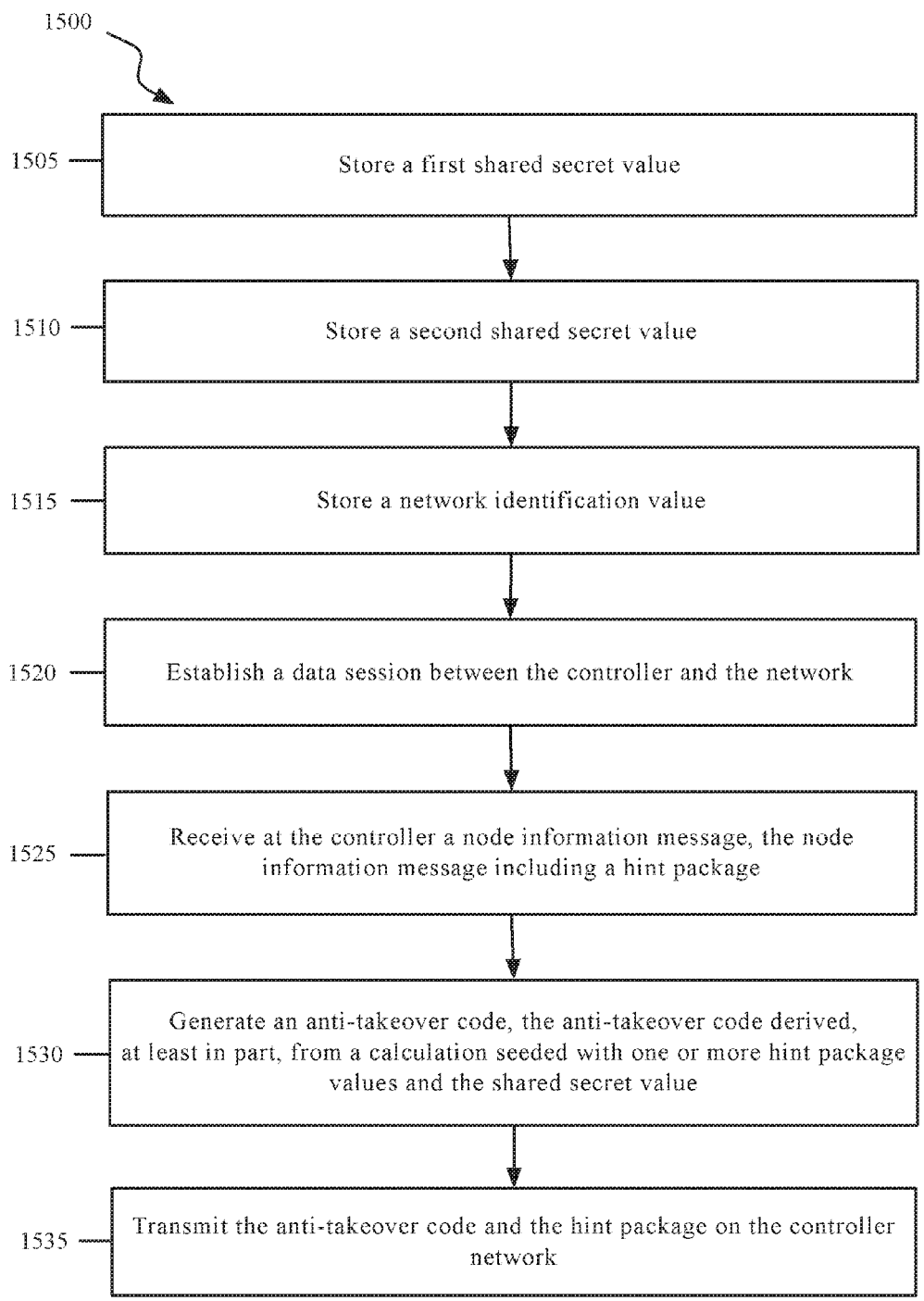
FIG. 10 is a flow diagram illustrating another exemplary method for a controller device to negotiate with a node device in protected mode in the network of FIG. 1.

Referring now to FIG. 10, a block diagram of an embodiment of FIG. 9 is shown. At block 1505 and block 1510, a first shared secret value is stored and a second shared secret value is stored. In some implementations, additional shared secrets are stored. In certain instances, the controller node data module 108, 113, (e.g., see FIG. 1) stores the shared secret values. The shared secret values may be written to memory at the time of manufacturing, or after release from manufacturing. The shared secret values may be common across one or more controller nodes 105, 110 in one or more controller networks associated with a common network identification value.

At block 1515, the, the controller node data module 108, 113, (e.g., see FIG. 1) may store a network identification value. The network identification value may be written to memory at the time of manufacturing, or after release from manufacturing. The network identification value may be associated with an entity such as, for example, a dealer. The network identification value may be common across one or more controller nodes 105, 110 in one or more controller networks.

At block 1520, the system may establish a data session between the peripheral device and the network. For example, a data session may be established between the node communication module 226 (e.g., see FIG. 2) of a controller node application module 205 and a network. The established data connection may be preceded by a handshake between controller node 105, 110, and a peripheral device. In some embodiments, the data connection may be a wireless connection.

At block 1525, the controller may receive the node information message at the node communication component 226 (e.g., see FIG. 2). The node information message may include a hint package. In some embodiments, the hint package includes a network identification value, such as, for example, a dealer identifier, a shared secret version value, and a random value such as a series of randomly generated bytes. The receipt of the hint package may be in response to the inclusion detection component 216 of node detection module 215 detecting a network inclusion event relating to the peripheral device.

At block 1530, the anti-takeover code module 220 (e.g., see FIG. 2) may generate an anti-takeover code. The anti-takeover code may be derived, at least in part, from a calculation seeded with one or more hint package values and the shared secret value. The shared secret may be retrieved from controller 105, 110 (e.g., see FIG. 1) memory. In some embodiments, one or more common shared secrets reside on multiple controller nodes 105, 110 located on different controller networks associated with a common dealer identification value. The retrieval of a particular shared secret may involve determining the shared secret associated with a particular manufacturer, a particular dealer, or both. Further, the selection of the shared secret may involve identifying a particular shared secret version.

The calculation may include a one-way hash function, such as, for example, the SHA-256 cryptographic hash algorithm, which may be seeded with the one or more hint package values and the shared secret. In some embodiments, a set of bytes are obtained from the result of the one-way hash algorithm. Some number of least significant bytes may be obtained from the result, such as the least significant 12 bytes, which may then constitutes the anti-takeover code. At block 1535, the controller communications module 225 (e.g., see FIG. 2) may transmit the anti-takeover code and the hint package on the controller network. In certain implementations, the network identification value is a hint package.

Figure 11:
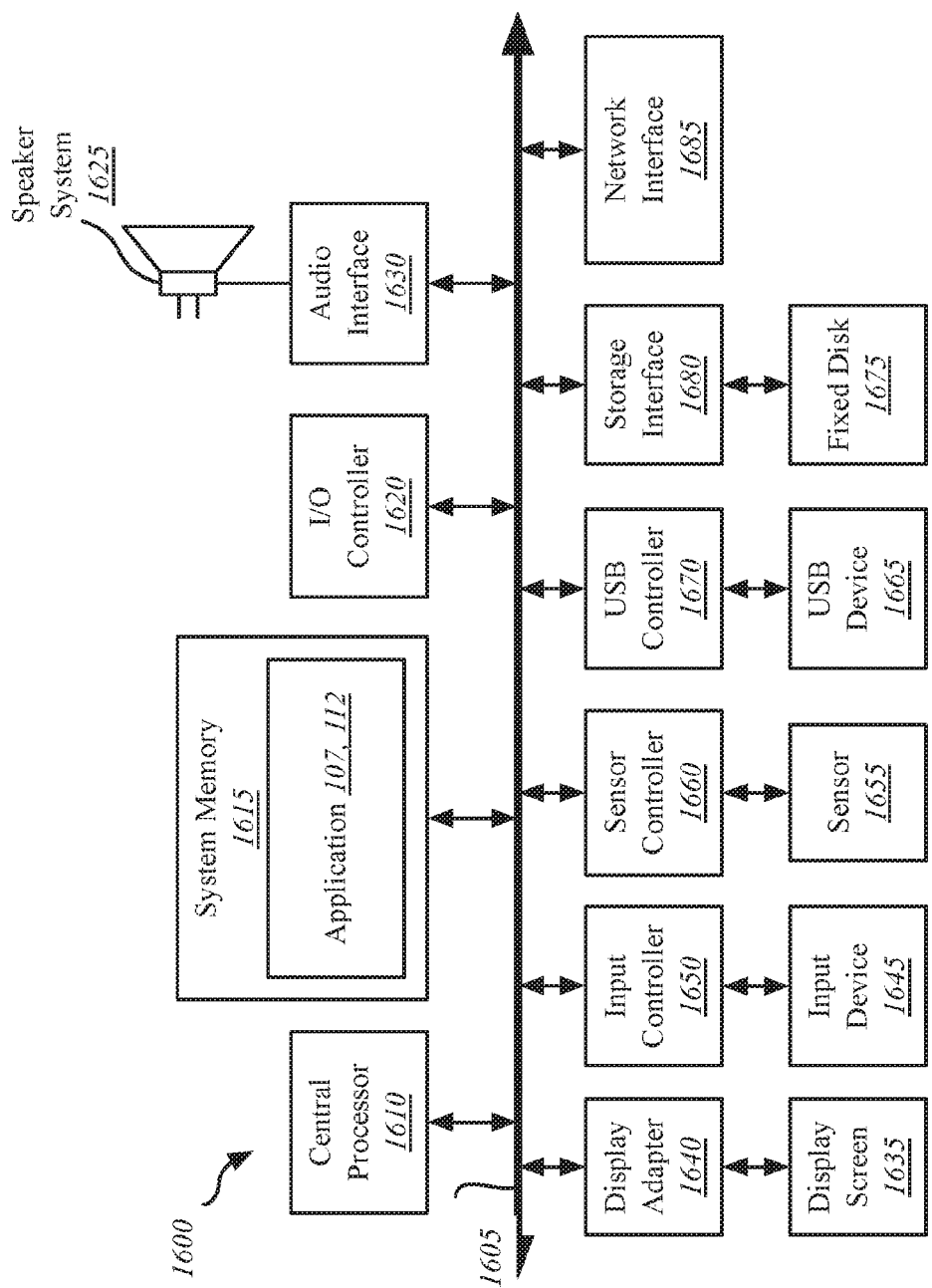
FIG. 11 is a block diagram of a computer system suitable for implementing the present systems and methods of FIG. 1.

Referring now to FIG. 11, the controller 1600 may be an example of a controller node 105, 110 (e.g, see FIG. 1). In one configuration, controller 1600 includes a bus 1605 which interconnects major subsystems of controller 1600, such as a central processor 1615, a system memory 1620 (typically RAM, but which may also include ROM, flash RAM, or the like), an input/output controller 1625, an external audio device, such as a speaker system 1630 via an audio output interface 1635, an external device, such as a display screen 1635 via display adapter 1640, an input device 1645 (e.g., remote control device interfaced with an input controller 1650), multiple USB devices 1665 (interfaced with a USB controller 1670), and a storage interface 1680. Also included are at least one sensor 1655 connected to bus 1605 through a sensor controller 1660 and a network interface 1685 (coupled directly to bus 1605).

Bus 1605 allows data communication between central processor 1615 and system memory 1620, which may include read-only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components or devices. Applications (e.g., application 140) resident with controller 1600 are generally stored on and accessed via a non-transitory computer readable medium, such as a hard disk drive (e.g., fixed disk 1675) or other storage medium. Additionally, applications may be in the form of electronic signals modulated in accordance with the application and data communication technology when accessed via interface 1685.

Storage interface 1680, as with the other storage interfaces of controller 1600, may connect to a standard computer readable medium for storage and/or retrieval of information, such as a fixed disk drive 1675. Fixed disk drive 1675 may be a part of controller 1600 or may be separate and accessed through other interface systems. Network interface 1685 may provide a direct connection to a remote server via a direct network link to the Internet via a POP (point of presence). Network interface 1685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1600 wirelessly via network interface 1685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 11 need not be present to practice the present systems and methods. The devices and subsystems may be interconnected in different ways from that shown in FIG. 11. The aspect of some operations of a system such as that shown in FIG. 11 are readily known in the art and are not discussed in detail in this application. Computer instructions to implement the present disclosure may be stored in a non-transitory computer-readable medium such as one or more of system memory 1620 or fixed disk 1675. The operating system provided on controller 1600 may be, for example, iOS®, ANDROID®, MS-DOS®, MS-WINDOWS®, OS/2®, UNIX®, LINUX®, OSX®, or another known operating system.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An automated anti-takeover method, the method comprising:
    identifying a data session between a peripheral device and a network;
    detecting an inclusion event associated with the peripheral device attempting to join the network;
    requesting a node information message from the peripheral device;
    parsing the node information message to obtain a current protection state value for the peripheral device;
    determining that the peripheral device is an anti-takeover device;
    determining that the anti-takeover device is in an unprotected state;
    retrieving a manufacturer associated network identification value;
    retrieving a shared secret version number from the parsed node information message;
    generating a random value; and combining the network identification value, shared secret version number, and random value to generate a hint package;
generating an anti-takeover code; and
unhobbling the peripheral device based at least in part on the generated hint package and the generated anti-takeover code.

2. The method of claim 1, wherein generating the anti-takeover code comprises:
retrieving the hint package;
retrieving a shared secret;
seeding a one-way hash algorithm with the hint package and the shared secret; and
obtaining a set of bytes from the one-way hash algorithm.

3. The method of claim 1, further comprising:
determining that the anti-takeover device is not in an unprotected state; and
comparing the manufacturer associated network identification value with a controller manufacturer associated network identification value, wherein the manufacturer associated network identification value and the controller manufacturer associated network identification value comprise an associated shared secret.

4. The method of claim 3, further comprising:
determining that the manufacturer associated network identification value is not a match with the controller manufacturer associated network identification value, based at least in part on the comparing; and
maintaining the peripheral device in a hobbled state.

5. The method of claim 3, further comprising:
determining that the manufacturer associated network identification value is a match with the controller manufacturer associated network identification value, based at least in part on the comparing;
retrieving a network identification value associated with the peripheral device from the parsed node information message; and
comparing the received network identification value with the controller manufacturer associated network identification value.

6. The method of claim 5, further comprising:
determining that the received network identification value is a match with the controller manufacturer associated network identification value, based at least in part on the comparing;
generating the hint package;
generating the anti-takeover code; and
unhobbling the peripheral device.

7. The method of claim 5, further comprising:
determining that the received network identification value is not a match with the controller manufacturer associated network identification value, based at least in part on the comparing; and
maintaining the peripheral device in a hobbled state.

8. The method of claim 1, further comprising:
storing a first shared secret value at a controller;
establishing the data session between the controller and the network;
generating the anti-takeover code, the anti-takeover code derived, at least in part, from a calculation seeded with the shared secret value;
generating the first hint package at the controller; and
transmitting the anti-takeover code and the first hint package.

9. The method of claim 8, further comprising:
generating a random number wherein the calculation is seeded with the random number.

10. The method of claim 8, wherein the node information message comprises a second hint package.

11. The method of claim 10, wherein the second hint package further comprises at least one from the group of a randomly generated value, a shared secret version value, and a network identification value.

12. The method of claim 8, wherein generating the anti-takeover code comprises performing a one-way function calculation.

13. The method of claim 12, wherein performing the one-way function calculation comprises seeding a hash function with one or more hint package values and the first shared secret value.

14. The method of claim 11, wherein the first shared secret value is associated with at least one from the group of a manufacturer identification value and the network identification value.

15. The method of claim 8, further comprising:
storing a second shared secret value.

16. A controller device for a security and/or automation system, comprising:
at least one processor and a memory configured to:
identify a data session between a peripheral device and a network;
detect an inclusion event associated with the peripheral device attempting to join the network;
request a node information message from the peripheral device;
parse the node information message to obtain a current protection state value for the peripheral device;
determine that the peripheral device is an anti-takeover device;
determine that the anti-takeover device is in an unprotected state;
retrieve a manufacturer associated network identification value;
retrieve a shared secret version number from the parsed node information message;
generate a random value; and
combine the network identification value, shared secret version number, and random value to generate a hint package;
generate an anti-takeover code; and
unhobble the peripheral device based at least in part on the generated hint package and the generated anti-takeover code.

17. The controller device of claim 16, wherein the at least one processor is further configured to:
retrieve the hint package;
retrieve a shared secret;
seed a one-way hash algorithm with the hint package and the shared secret; and
obtain a set of bytes from the one-way hash algorithm.

18. The controller device of claim 17, wherein the at least one processor is further configured to:
store a first shared secret value at the controller;
establish the data session between the controller and the network;
generate the anti-takeover code, the anti-takeover code derived, at least in part, from a calculation seeded with the shared secret value;
generate a first hint package at the controller; and
transmit the anti-takeover code and the first hint package.

* * * * *